US008873821B2

(12) United States Patent
Smith et al.

(10) Patent No.: US 8,873,821 B2
(45) Date of Patent: Oct. 28, 2014

(54) SCORING AND ADJUSTING PIXELS BASED ON NEIGHBORHOOD RELATIONSHIPS FOR REVEALING DATA IN IMAGES

(75) Inventors: Paul Reed Smith, Annapolis, MD (US); Jack W. Smith, Belle Haven, VA (US); Shane G. W. Morris, Owings Mills, MD (US); F. Michael Slay, Okatie, SC (US)

(73) Assignee: Paul Reed Smith Guitars Limited Partnership, Stevensville, MD (US)

( * ) Notice: Subject to any disclaimer, the term of this patent is extended or adjusted under 35 U.S.C. 154(b) by 34 days.

(21) Appl. No.: 13/425,240

(22) Filed: Mar. 20, 2012

(65) Prior Publication Data
US 2013/0251223 A1    Sep. 26, 2013

(51) Int. Cl.
G06K 9/00    (2006.01)

(52) U.S. Cl.
USPC ......................................... 382/131

(58) Field of Classification Search
None
See application file for complete search history.

(56) References Cited

U.S. PATENT DOCUMENTS

| | | | |
|---|---|---|---|
| 4,797,923 A | | 1/1989 | Clarke |
| 4,884,229 A | | 11/1989 | Dekker |
| 5,055,926 A | * | 10/1991 | Christensen et al. .......... 348/172 |
| 5,506,699 A | * | 4/1996 | Wong ............................ 358/3.08 |
| 5,780,759 A | | 7/1998 | Szalay |
| 5,805,721 A | | 9/1998 | Vuylsteke et al. |
| 5,978,518 A | | 11/1999 | Oliyide et al. |
| 5,982,940 A | * | 11/1999 | Sawada ......................... 382/260 |
| 6,181,822 B1 | * | 1/2001 | Miller et al. .................. 382/232 |
| 6,195,467 B1 | * | 2/2001 | Asimopoulos et al. ....... 382/261 |
| 6,681,054 B1 | | 1/2004 | Gindele |

(Continued)

FOREIGN PATENT DOCUMENTS

| EP | 1 679 654 A1 | 7/2006 |
|---|---|---|
| EP | 1679654 A1 | 7/2006 |

(Continued)

OTHER PUBLICATIONS

Casey, Auditory Group Theory with Applications to Statistical Basis Methods for Structured Audio, Chapter 3 [online], Feb. 2, 1998 [retrieved on Jan. 6, 2011]. Retrieved from the Internet, <http://alumni.media.mitedu/mkc/thesis/> pp. 81-124.

(Continued)

*Primary Examiner* — Chan Park
*Assistant Examiner* — Elisa Rice
(74) *Attorney, Agent, or Firm* — Sterne, Kessler, Goldstein & Fox P.L.L.C.

(57) ABSTRACT

A machine/computer implemented system, method, and computer program product for scored pixel intensity value adjustment of a digital image is disclosed. The system is configured to obtain a digital image from data storage and perform pixel-by-pixel comparisons to generate per pixel scores. The types of comparisons include discovering minima and maxima per pixel scores by comparing to neighboring non-adjacent pixel pairs, delta pair scores by comparing to neighboring pixels, and multiple vector score types by comparing to vectors made up of individual pixels. This new information is applied to adjust each pixel's value. The system is further configured to generate a collection of such scores for a plurality of pixels in a digital image and to generate a multi-dimensional scored pixel adjusted image. The scored pixel adjustment yields a new digital image, wherein the value of a given pixel is adjusted based on one or more of the score types.

48 Claims, 36 Drawing Sheets
(14 of 36 Drawing Sheet(s) Filed in Color)

(56) References Cited

U.S. PATENT DOCUMENTS

| | | |
|---|---|---|
| 6,766,288 B1 | 7/2004 | Smith |
| 6,798,886 B1 | 9/2004 | Smith et al. |
| 7,003,120 B1 | 2/2006 | Smith et al. |
| 7,065,257 B2 | 6/2006 | Soga et al. |
| 7,706,626 B2 | 4/2010 | Heath et al. |
| 7,822,256 B2 | 10/2010 | Couwenhoven et al. |
| 2001/0045153 A1 | 11/2001 | Alexander et al. |
| 2003/0061035 A1 | 3/2003 | Kadambe |
| 2003/0223354 A1 | 12/2003 | Olszewski |
| 2004/0243657 A1 | 12/2004 | Goren et al. |
| 2005/0265431 A1 | 12/2005 | Pietila et al. |
| 2006/0111801 A1 | 5/2006 | Weare et al. |
| 2006/0265218 A1 | 11/2006 | Samadani |
| 2007/0064792 A1 | 3/2007 | Chiu et al. |
| 2007/0286430 A1 | 12/2007 | Thomas et al. |
| 2008/0034870 A1 | 2/2008 | Kurt-Elli |
| 2010/0092102 A1* | 4/2010 | Sun ............................... 382/260 |

FOREIGN PATENT DOCUMENTS

| | | |
|---|---|---|
| WO | WO 2011/059432 A1 | 5/2011 |
| WO | WO 2011/060130 A1 | 5/2011 |
| WO | WO 2011/060145 A1 | 5/2011 |

OTHER PUBLICATIONS

De Haan, A Survey on Methods for Time-Frequency Analysis, Thesis [online], Mar. 1998 [retrieved on Jan. 6, 2011]. Retrieved from the Internet, <http://www.bth.se/fou/cuppsats.nsf/all/af1cac2d8bb9c1256def004e1c5e/$file/A%20Survey%20on%20Methods%20for%20Time-Frequency%20Analysis.pdf> 106 Pages.

Ozbek et al., Musical Note and Instrument Classification with Likelihood-Frequency-Time Analysis and Support Vector Machines, Dec. 2007 [retrieved on Jan. 6, 2011]. Retrieved from the Internet <http://doc-Oc-94-docsviewer.googleusercontent.com/viewer/securedownload/dsnlaovipa718461sfcf94nedj8q2p4u/6p80egO2o012k7o9q1jp1s8g21q77oio/1294416900000/Ymw./AGZ5hq8BgbJY1gwa0Yx83cPOdNw6/QURHRUVTaFh1Zzl3c3U10XdLRXpmbjdUVkVndHEta1ILMzVTT3VPTVcyYm9uVH13dUZJSjdjeXpiakd6ZmVBLUdUbGNEUDQyNkg3ajJ2bDZKQ3ZTTVZGTVBIZDNLSjBYaWd1VFBkQUx6 6MkhBNm4yaHJFZjVhM0tUQUo5V29jQUZJYS1xNGFrdC1PMX1=?a=gp&filename=download&chan=EQAAAE4jsXHXBcaZcAZNQOG//57SwmkYEVNd9SrNBPnFb8IA&docid=41 2f94d7fad684276ac48ae1435b53b8&sec=AHSqidZUOCOzTgXHE-HEPdy4kf2xopNFDMApOWSAj5Qm_MdrMEhTcDgDeozCNjP1xHRUY9v17om&nonce=7enj82u88oc2a&user=AGZ5hq8BgbJY1gwa0Yx83cP0dNw6&hash=d8qjgp4iqbdivrtm5eqifoak4bc1ntfp> pp. 941-945.

Regalia et al., "The Digital All-Pass Filter: A Versatile Signal Processing Building Block," Proceedings ofthe IEEE, vol. 76, No. 1 (1988), pp. 19-37.

Sawada et al., Spectral Smoothing for Frequency-Domain Blind Sourceseparation, Sep. 2003 [retrieved on Jan. 6, 2011]. Retrieved from the Internet, <URL:http://www.kecl.ntt.cojp/icl/signal/iwaenc03/cdrorn/data/0070.pdf>pp. 311-314.

"DICOM," Wikipedia.org, accessed at http://en.wikipedia.org/wiki/DICOM, accessed on Nov. 16, 2011, 11 pages.

Doi, Kunio, "Computer-aided diagnosis in medical imaging: Historical review, current status and future potential," Computerized Medical Imaging and Graphics 31 (2007), pp. 198-211, Elsevier Ltd., 2007.

Felsberg, M., et al., "The Monogenic Scale-Space: A Unifying Approach to Phase-Based Image Processing in Scale-Space," Journal of Mathematical Imaging and Vision 21: 5-26 (2004), Kluwer Academic Publishers, Netherlands, 2004.

Maini, R., et al., "A Comprehensive Review of Image Enhancement Techniques,"Journal of Computing, vol. 2, Issue 3, Mar. 2010, 6 pages.

Hanbury, A., "A Short Introduction to Digital Image Processing," accessed at http://cmm.ensmp.fr/~hanbury/intro_/intro_ip/, accessed on Nov. 16, 2011, 6 pages.

Lu, J., Contrast enhancement of medical images using multiscale edge representation, Optical Engineering 33(7), 2151-2161 (Jul. 1994).

Morrow, M., et al. "Region-Based Contrast Enhancement of Mammograms,"IEEE Transactions on Medical Imaging, vol. 11, No. 3, Sep. 1992, pp. 392-406.

O'Gorman, L., et al., "The Wedge Filter Technique for Convex Boundary Estimation," IEEE Transaction on Pattern Analysis and Machine Intelligence, vol. PAMI-7, No. 3, May 1985.

Simoncelli, E.P., et al., "The Steerable Pyramid: A Flexible Architecture for Multi-Scale Derivative Computation," Presented at the 2nd Annual IEEE International Conference on Image Processing. Washington, DC. Oct. 1995, 4 pages.

Lindeberg, T., "Scale-space: A framework for handling image structures at multiple scales," Proc. CERN School of Computing, Egmond aan Zee, The Netherlands, Sep. 8-21, 1996, 12 pages.

Katkovnik, V., et al, "Directional Varying Scale Approximations for Anisotropic Signal Processing," Signal Processing Laboratory, Tampere University of Technology, Tampere, Finland, 4 pages, 2004.

Susomboon, R., et al., "Pixel-Based Texture Classification of Tissues in Computed Tomography," Intelligent Multimedia Processing Laboratory School of Computer Science, Telecommunications, and Information Systems DePaul University, Chicago, Illinois, 10 pages, May 2006.

Disney, T., et al., "MedIX 2006 Week 3 CBIR Report," Jun. 2006.

Pham, M., et al., "A Comparison of Texture Models for Automatic Liver Segmentation," SPIE Medical Imaging Conf., San Diego, CA (2007).

Pham, D.L., et al., "Current Methods in Medical Image Segmentation," Annual Review of Biomedical Engineering, vol. 2 pp. 315-337 (200).

"Unsharp masking," Wikipedia.org, accessed at http://en.wikipedia.org/wiki/Unsharp_masking, accessed on Nov. 16, 2011, 4 pages.

Suetens, P., "Fundamentals of Medical Imaging (ABSTRACT)," Cambridge University Press, 2002, Cambridge, UK, accessed at http://books.google.com/books/about/Fundamentals_of_Medical_Imaging.html?id=PzY6AN2KEoAC, accessed Apr. 13, 2012.

Invitation to Pay Additional Fees and Communication Relating to the Results of the Partial International Search from PCT/US2013/030709, dated Aug. 9, 2013, 4 pages.

Gonzalez, R.C. and Woods, R.E., "*Digital Image Processing*", Chapter 4, Addison-Wesley Publishing Co., Sep. 1993, pp. 161-201.

International Search Report and Written Opinion directed to International Application No. PCT/US2013/030709, mailed on Oct. 10, 2013; 19 pages.

Deshpande et al., "Max-Mean and Max-Median filters for detection of small-targets," Proceedings of the SPIE Conference on Signal and Data Processing of Small Targets 1999, SPIE vol. 3809, Published Jul. 1999; pp. 74-83.

Lindsay, David, "Chapter 4—Image Enhancement," In Digital Image Processing by Gonzalez et al., Published Sep. 1, 1993: pp. 161-201.

\* cited by examiner

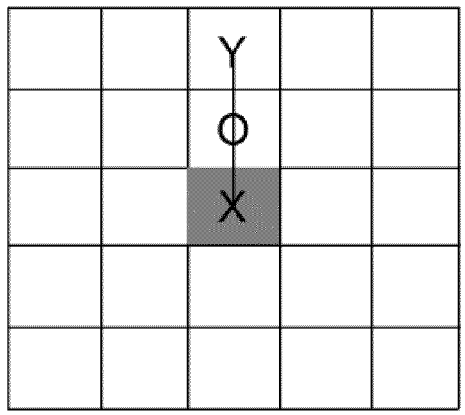
FIG. 8A
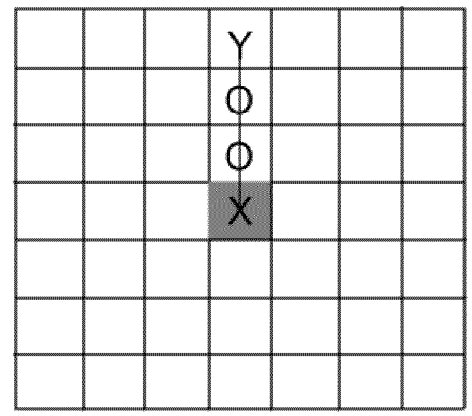
FIG. 8B
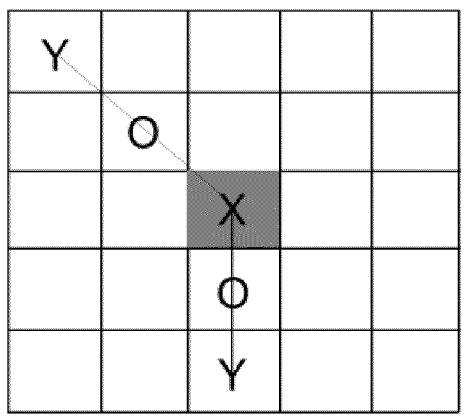
FIG. 8C
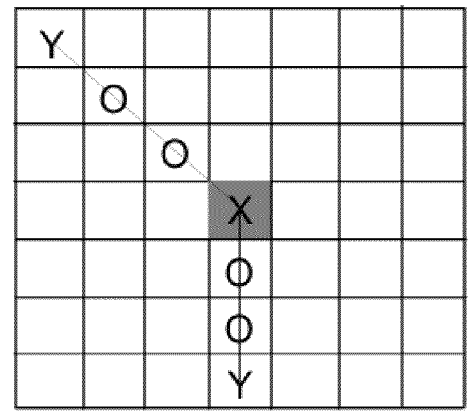
FIG. 8D
| Y | O | Y | O | Y |
|---|---|---|---|---|
| O | O | O | O | O |
| Y | O | X | O | Y |
| O | O | O | O | O |
| Y | O | Y | O | Y |
FIG. 8E
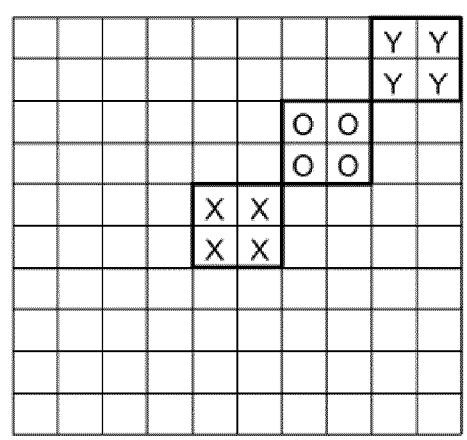
FIG. 8F 50% Maxima Pixel Change Example

SCORING AND ADJUSTING PIXELS BASED ON NEIGHBORHOOD RELATIONSHIPS FOR REVEALING DATA IN IMAGES

BACKGROUND

1. Field

This disclosure relates to image processing in general and image enhancement in particular.

2. Background

Image processing is any form of signal processing for which the input is an image. For example, the input image may be a photograph, video, video frame, or digitally created image. The output of image processing may be another image, or parameters related to the image that may characterize the image. Many image processing techniques treat an image as a two-dimensional signal and apply signal-processing techniques to it. Image processing is used in a wide variety of scientific, engineering, and medical disciplines including photography, computer graphics, computer vision, photo analysis, pattern recognition, fingerprint analysis, imagery, facial recognition, analysis of structural and material damage and defects, and radar, as well as many others.

An important application of image processing is medical imaging. Medical imaging has played an increasing role in the detection and diagnosis of disease and medical anomalies over the past few decades. Imaging and image processing are used routinely in the analysis of X-ray diagnostics, ultrasound, and in three-dimensional visualization of computed tomography (CT), magnetic resonance imaging (MRI) data, and the like. The current state of the art is the result of significant advances in nearly all aspects of image processing including image segmentation, quantification, enhancement, visualization, compression, and storage.

Image enhancement refers to techniques that are used to adjust an image, including techniques to improve contrast and reduce noise. Image segmentation is used to identify structures of interest in an image and to differentiate them. Techniques used in image segmentation include thresholding, region growing, and pattern recognition, for example. Quantification is applied to segmented structures to extract important diagnostic information such as shape, size, texture, etc., of features in a medical image. Registration refers to the process of correctly registering (i.e., lining up) two images of the same subject/target that are obtained by different modalities such as from a CT scan and an MRI scan. Visualization refers to the use of specialized hardware and software to visually inspect medical and biological data. Contrast enhancement commonly refers to changing pixel values based on intensity curves. Compression, storage, and communication of medical images constitute a field for which there is increasing demand due to the large volume of data that can be produced in modern diagnostic tests.

Current image enhancement techniques can be divided into two categories: (1) spatial domain methods, and (2) frequency domain methods. Spatial domain methods manipulate the pixel intensity values to achieve a desired enhancement. Frequency domain methods usually involve performing a Fourier Transform on the image. Next, image enhancement manipulations are carried out on the Fourier Transformed image. Finally, an Inverse Fourier Transform is carried out to produce a final enhanced image.

Spatial domain image enhancement algorithms can be thought of as a transform $s=T(r)$ of one pixel intensity $r$ in the raw image to yield a new pixel intensity $s$ in the enhanced image. In this context, the transform "T" is any function that transforms the intensity of a given pixel from the value "r" to the value "s." The range of possible values for a grey-scale pixel is determined by the number of bits "k" used to represent the intensity. The range of intensity values falls in the interval $\{0, (L-1)\}$ where $L=2^k$. For example, for an 8-bit image (i.e., $k=8$), the range would be in the interval $\{0, 255\}$. Color images can be represented by associating with each pixel a plurality of intensities (e.g., three color intensities, one each for red, green, and blue). Other pixel intensity representations are common in the field as would be apparent to a person of ordinary skill in the relevant art.

When carrying out a transform in the spatial domain, it is often convenient to normalize the intensity values $r$ and $s$, to lie in the range $\{0, 1\}$. The transformation $s=\log(1+r)$ is a simple example of a pixel intensity transform in the spatial domain.

There are no existing image enhancement algorithms that solve all of the technical challenges faced by the field of medical imaging and diagnosis. There is therefore a need for improved image enhancement techniques for medical anomaly and disease detection and diagnosis.

BRIEF SUMMARY OF THE INVENTION

A machine-implemented method is disclosed, for adjusting images to detect faint anomalies or imperceptible details. The disclosed embodiments represent new techniques for producing superior image enhancement through intelligent contrasting by one or more ways of mathematically scoring the pixels in images and in turn adjusting their values based on the calculated scores. The present invention is directed to discovering each pixel's neighborhood relationships and using those relationships adjust each pixel's value(s), thus revealing faint or hidden data contained in the image.

A machine-implemented system for generating a scored pixel adjustment of an image is disclosed. The system includes a receiver module, a score generation module, a pixel value adjustment module, an image adjustment module, and an output module. The receiver module is configured to receive a digital image having a collection of pixels each with a corresponding value. The score generation module is configured to determine at least one of the following for each pixel: minima scores, maxima scores, delta pair scores, and vector scores. The pixel value adjustment module is configured to adjust the values of pixels based on the one or more score results. The image adjustment module is configured to generate an adjusted image based on the adjusted pixel values. The output module is configured to output (e.g., to display, store, or transmit) the adjusted image.

In a further embodiment, a computer readable storage medium having program instructions stored thereon is disclosed. The program instructions, when executed by a processor, cause the processor to generate a scored pixel adjustment of an image. The program instructions cause a processor to receive a digital image having a collection of pixels each with a corresponding value and to determine at least one of a minima score, a maxima score, a delta pair score, and a vector score. The program instructions further cause the processor to adjust the values of pixels based on the at least one determined score and to generate corresponding adjusted pixel values. Further, the program instructions cause the processor to generate an adjusted image based on the adjusted pixel values; and output the adjusted image. In this context, outputting includes at least one of displaying, printing, storing, transmitting, or sending the adjusted image.

Further features and advantages as well as the structure and operation of various embodiments are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS/FIGURES

The patent or application file contains at least one drawing executed in color. Copies of this patent or patent application publication with color drawings will be provided by the U.S. Patent and Trademark Office upon request and payment of the necessary fee.

Figure 3A:
Figure 3B:
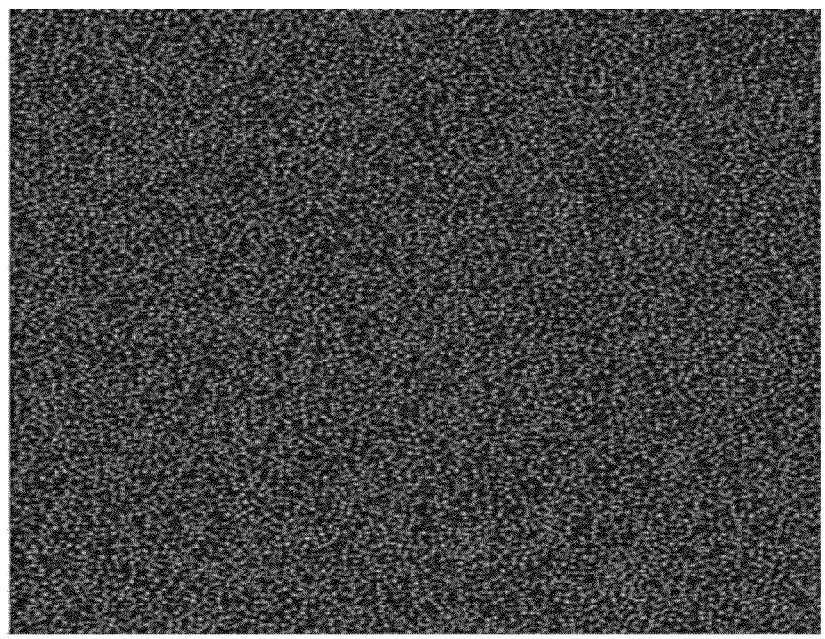

FIGS. 3A and 3B respectively represent a DNA bead image before and after image adjustment, according to an embodiment of the invention.

Figure 3C:
Figure 3D:
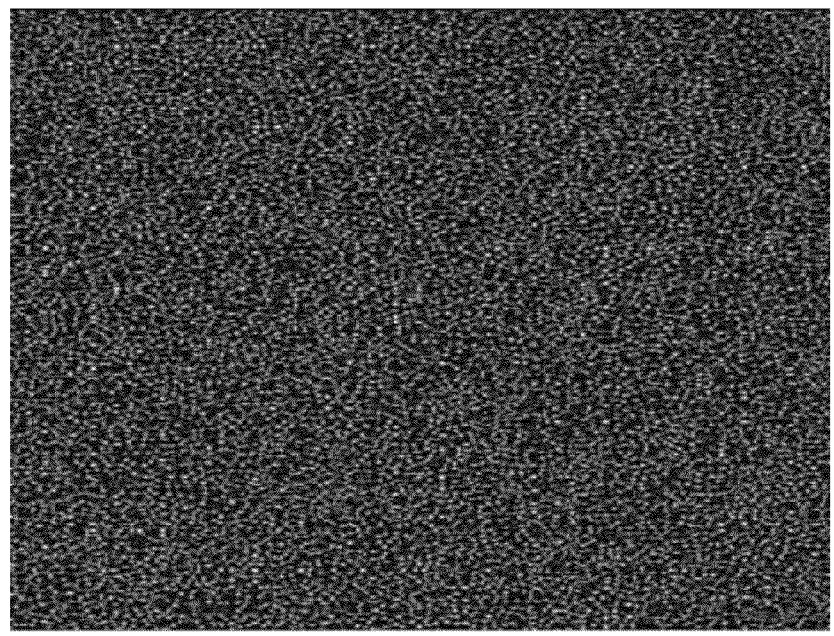

FIGS. 3C and 3D respectively represent a further example DNA bead image before and after image adjustment, according to an embodiment of the invention.

Figure 4A:

FIG. 4A illustrates an original mammogram image.

Figure 4B:
Figure 4C:
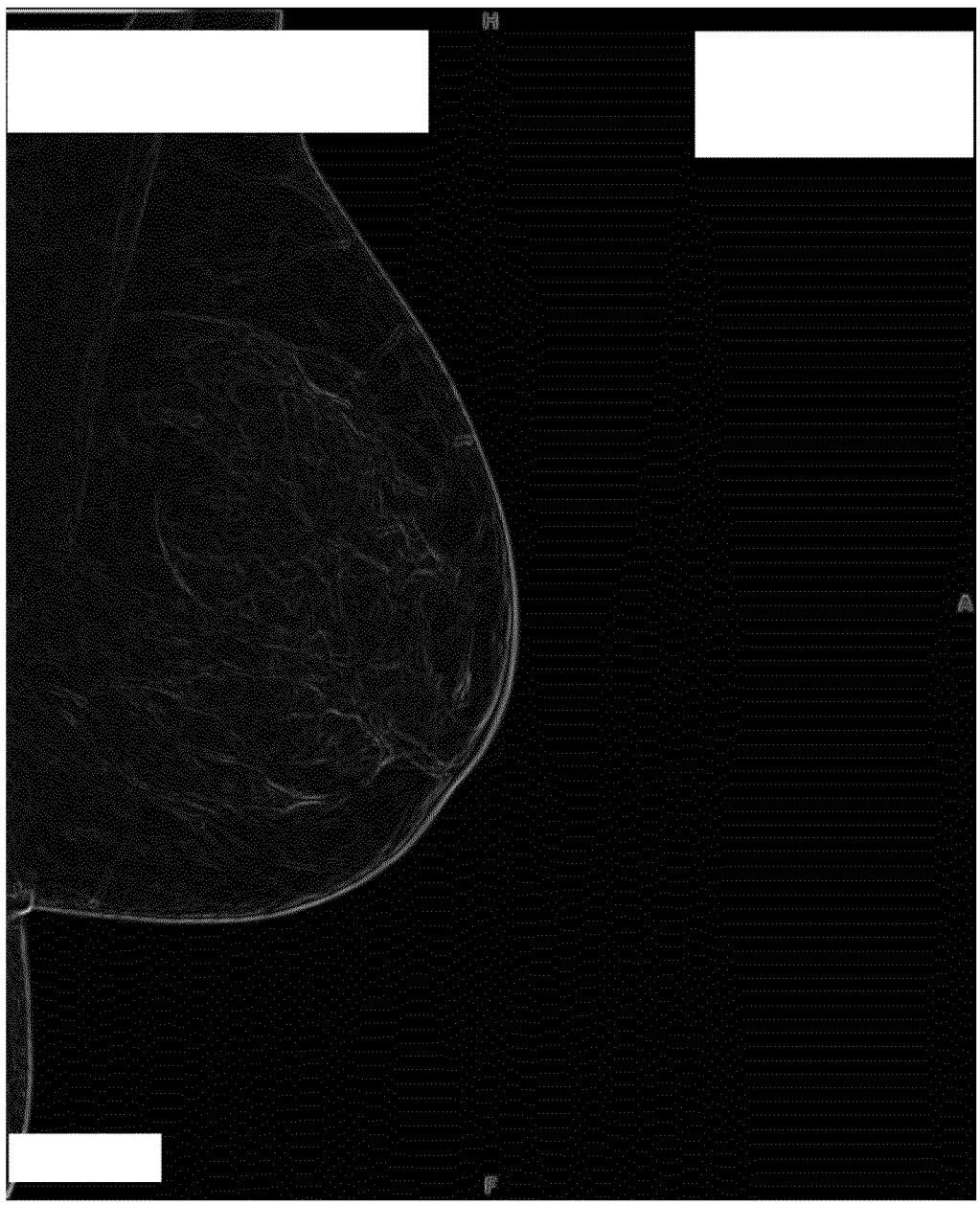

FIGS. 4B and 4C are adjusted images based on the image of FIG. 4A according to embodiments of the invention.

Figure 4D:
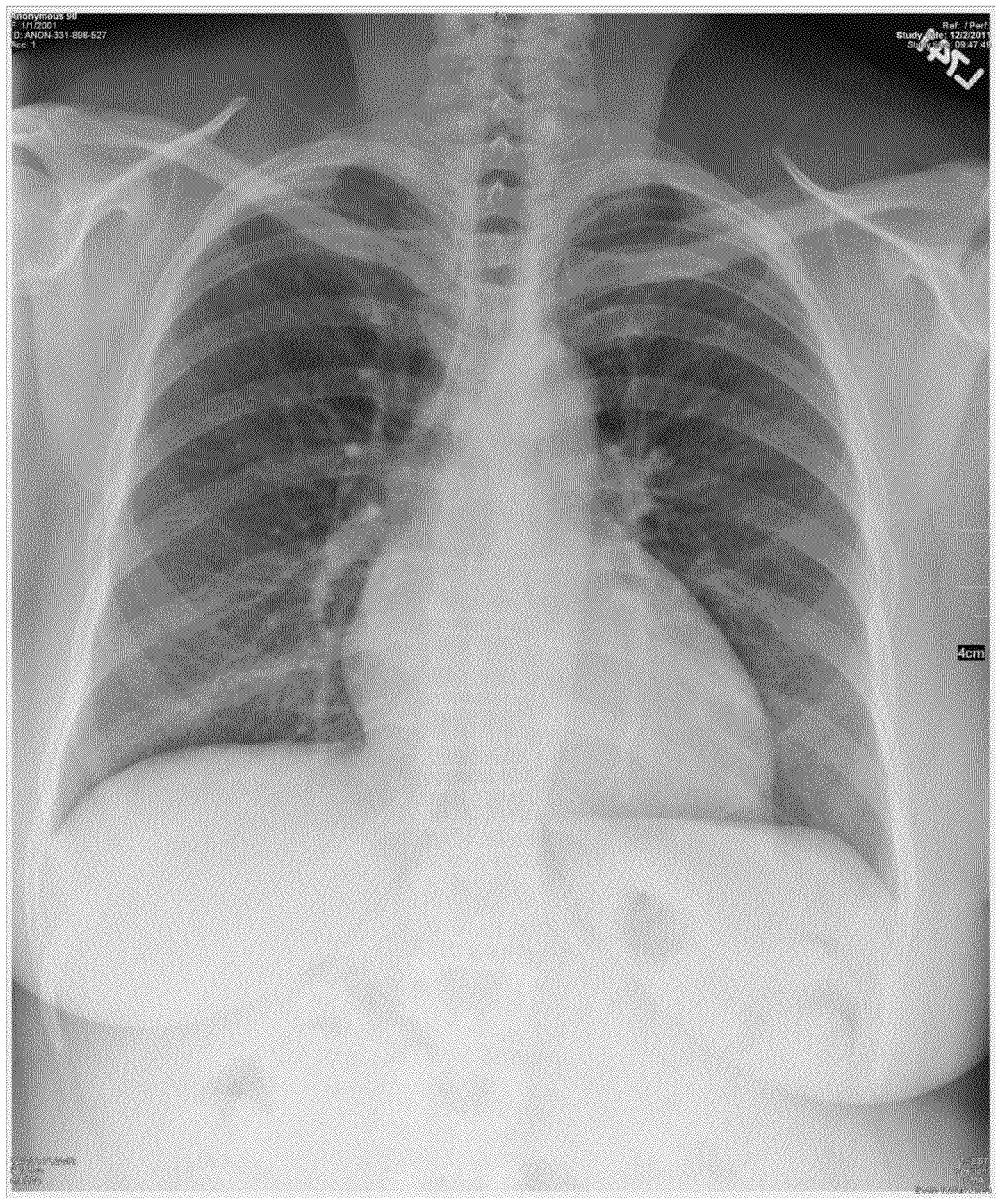
Figure 4E:
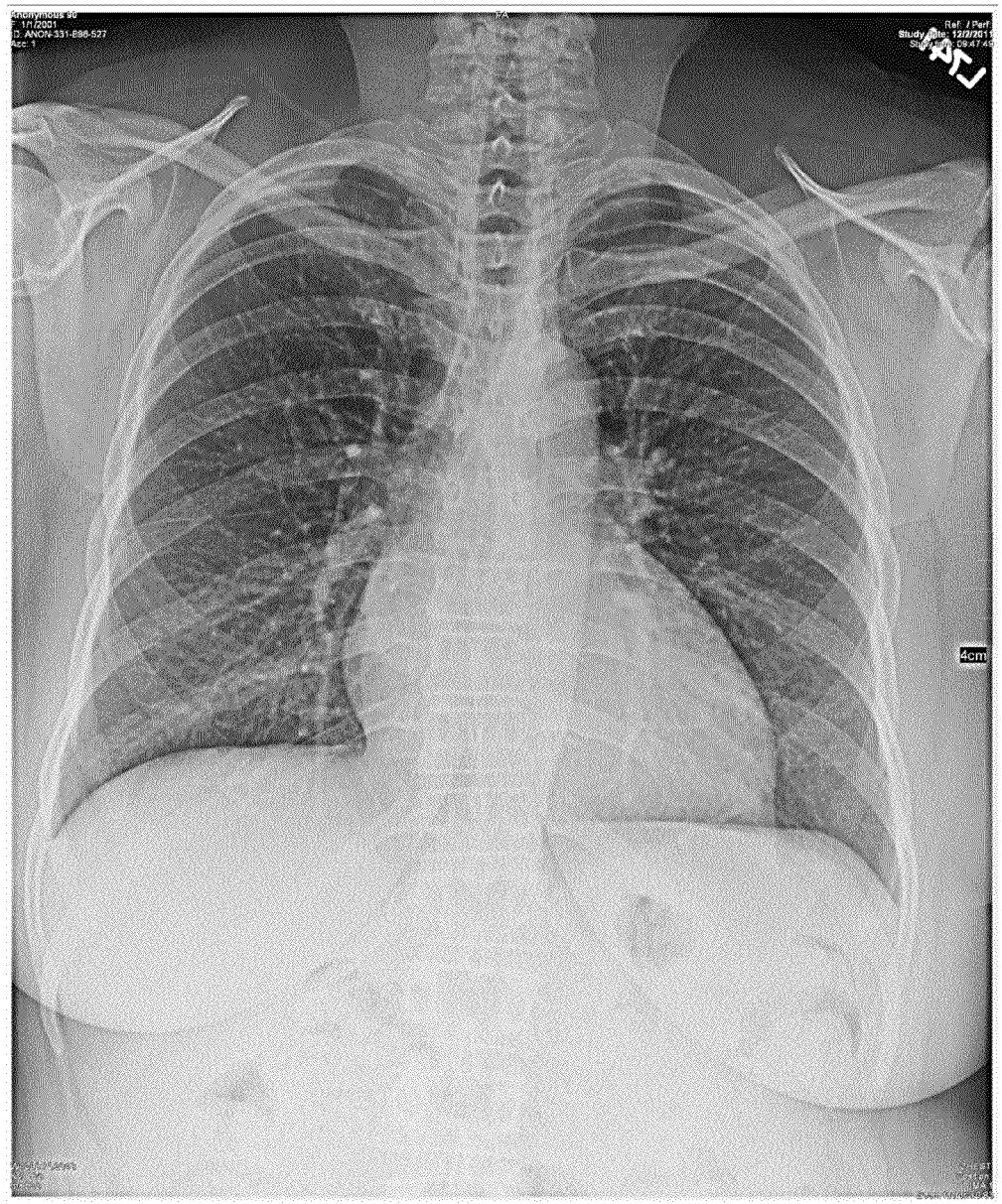

FIGS. 4D and 4E respectively illustrate a chest X-ray image before and after image adjustment, according to an embodiment of the invention.

Figure 5:
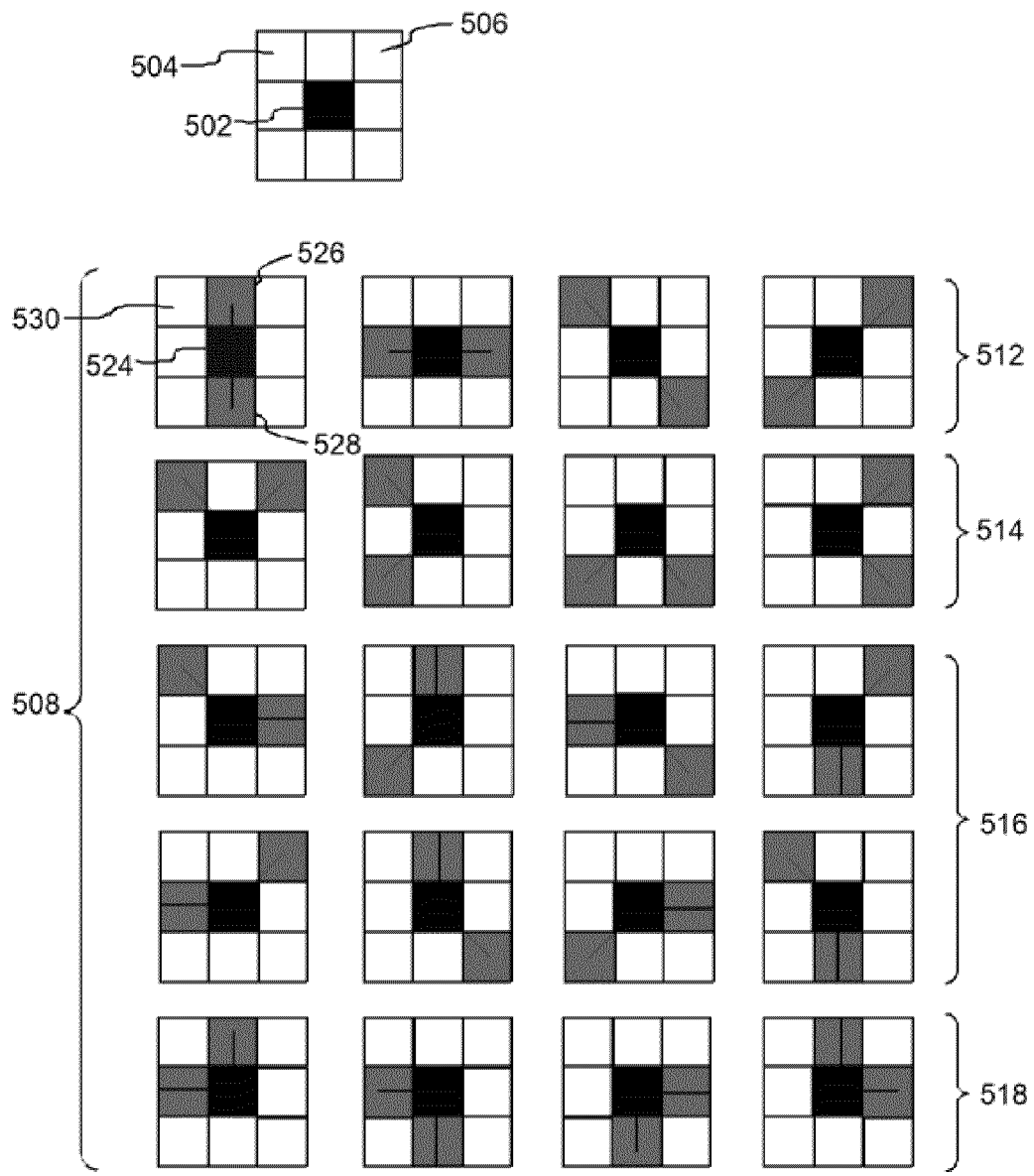

FIG. 5 illustrates pixel-level comparisons involved in defining minima and maxima scores for generating an adjusted image, according to an embodiment of the invention.

Figure 6:
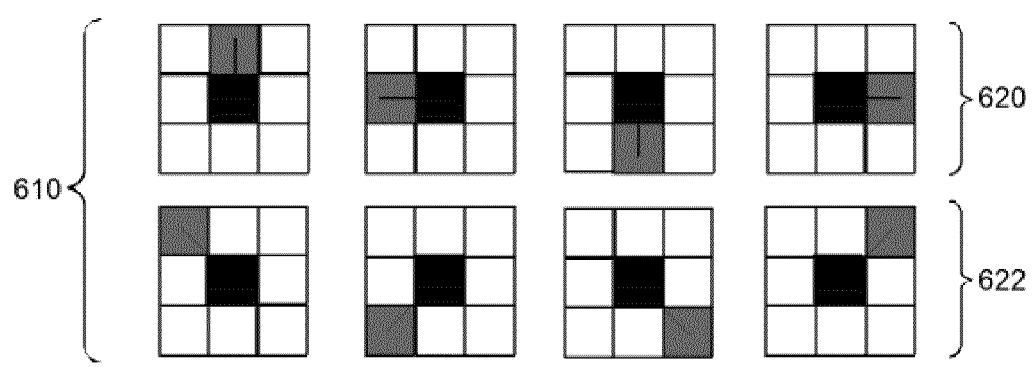

FIG. 6 illustrates pixel-level comparisons involved in generating delta pairs and delta pair scores for generating an adjusted image, according to an embodiment of the invention.

Figure 7A:
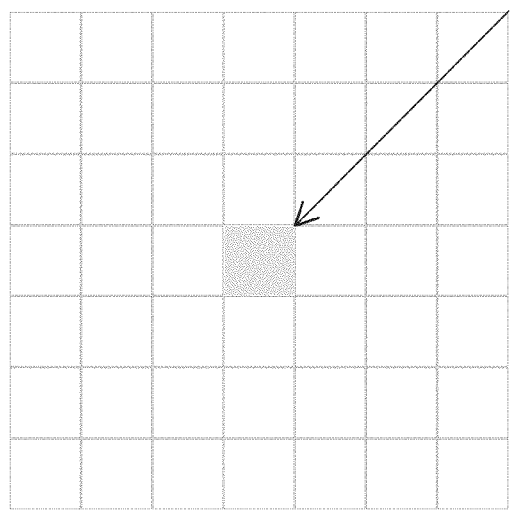

FIG. 7A illustrates a single vector of pixels used to define a vector value for generating an adjusted image, according to an embodiment of the invention.

Figure 7B:
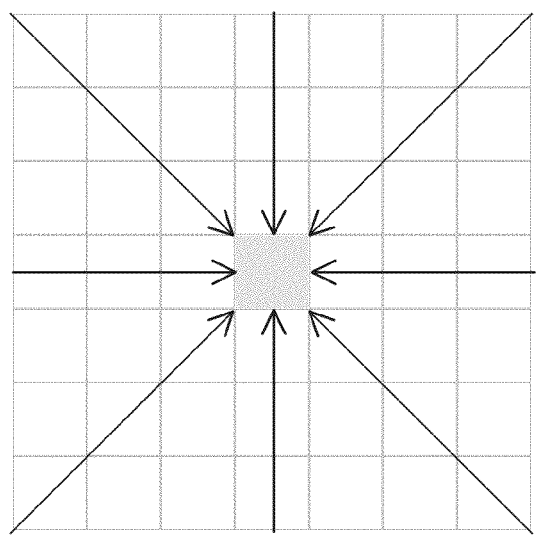

FIG. 7B illustrates a collection of vectors used to define the vector values for selecting a primary vector, according to an embodiment of the invention.

Figure 7C:
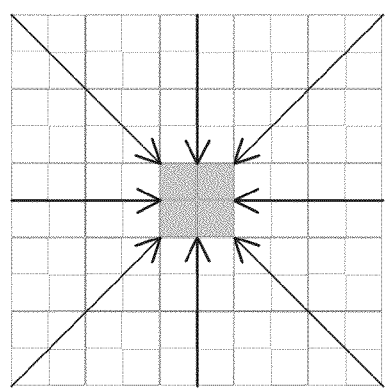

FIG. 7C illustrates "down sampling"—wherein blocks of 4 pixels are used to define an effective pixel, according to an embodiment of the invention.

FIGS. 8A-8E illustrate "jumping the gap"—wherein a pixel being compared to the centroid pixel does not touch the centroid pixel and the pixels in between are ignored, according to an embodiment of the invention.

FIG. 8F illustrates comparisons involving jumping the gap, in combination with down sampling, according to an embodiment of the invention.

Figure 8G:
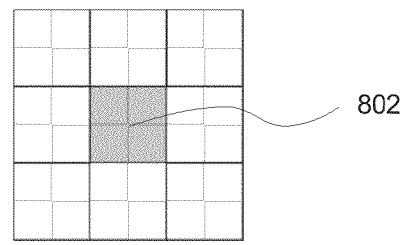
Figure 8H:
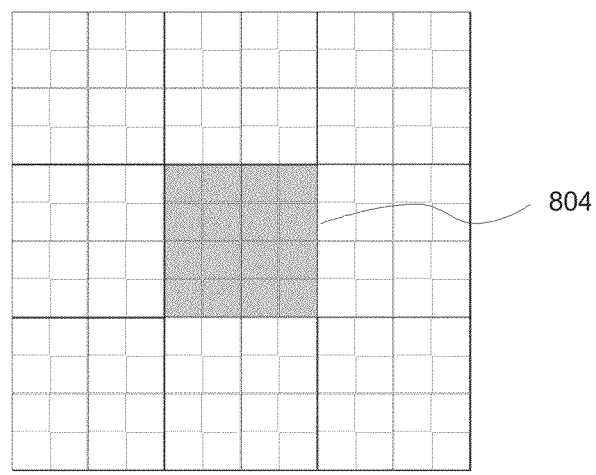

FIGS. 8G and 8H illustrate further example comparisons involving down sampling, which could be used for defining pixel minima, maxima, delta pairs and vector scoring, according to an embodiment of the invention.

Figure 8I:
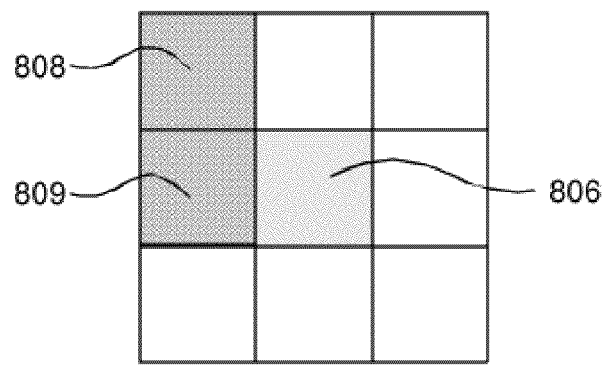
Figure 8J:
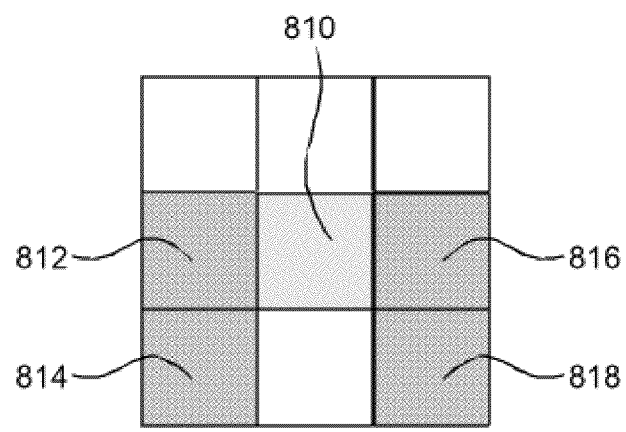

FIGS. 8I-8J illustrate pixel cluster combinations that could be used for defining pixel minima, maxima, delta pairs and vector scoring, according to an embodiment of the invention.

Figure 8K:
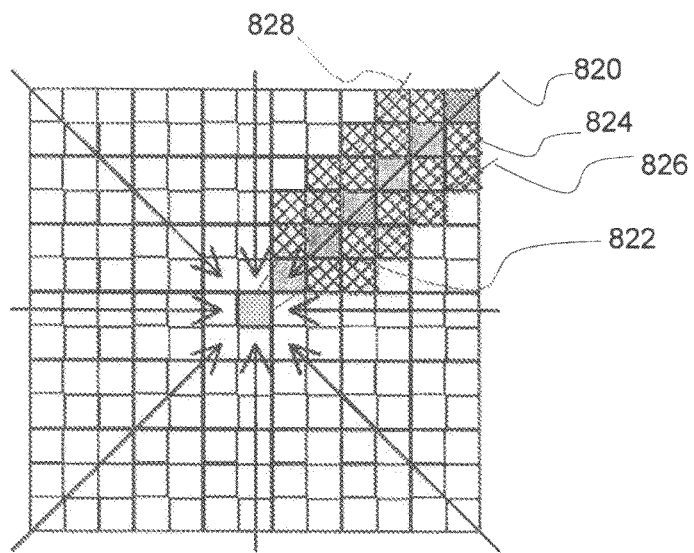

FIG. 8K illustrates a generalization of the concept of a vector. This line of pixels can be used to make comparisons. In this case, the hatched pixels show how neighboring pixels can be included in the pixel vector calculation.

Figure 8L:
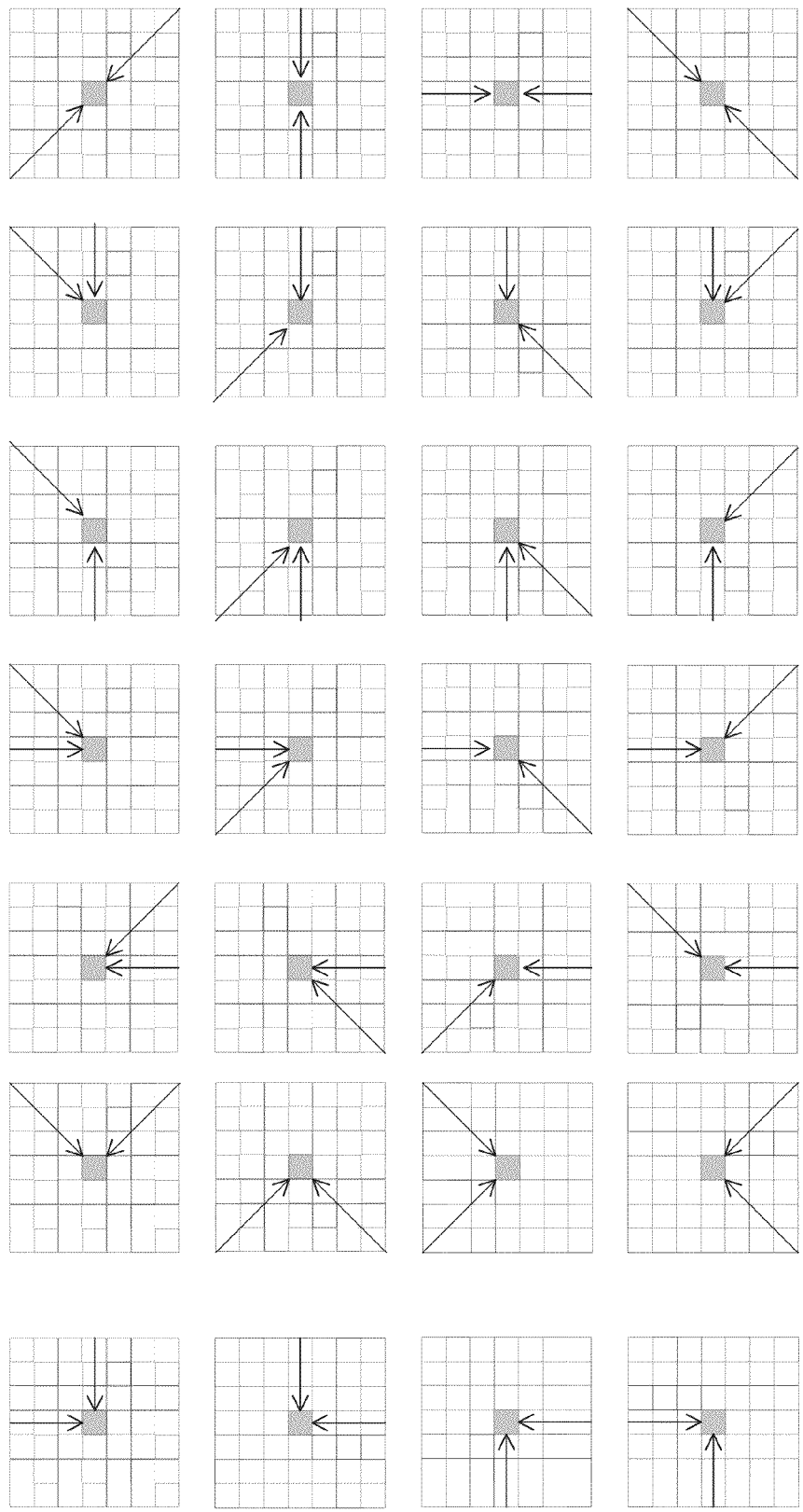

FIG. 8L illustrates vector combinations to be used in the adjustment of pixels, according to an embodiment of the invention.

Figure 8M:
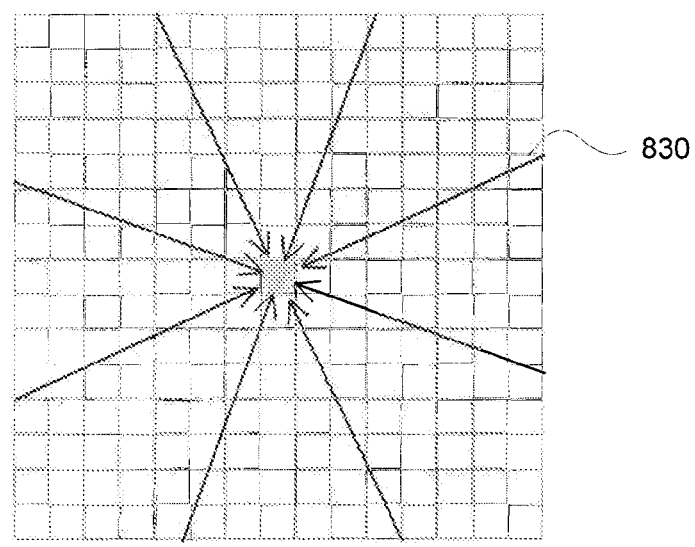

FIG. 8M illustrates vectors at various angles not aligned with the regular eight compass points, according to an embodiment of the invention.

Figure 8N:
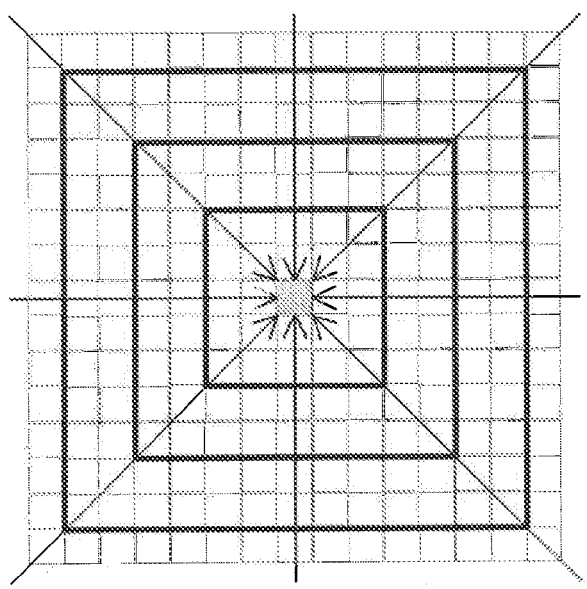

FIG. 8N illustrates various vector lengths that can be used in combination for the scoring and adjustment of centroid pixels, according to an embodiment of the invention.

Figure 8O:
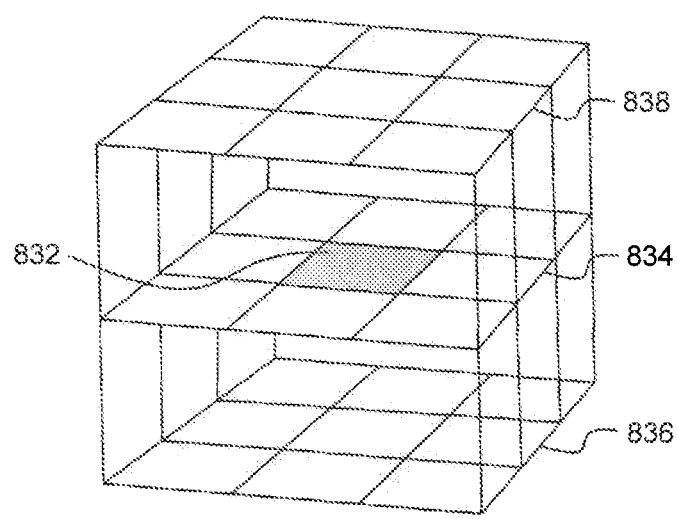

FIG. 8O illustrates extending the basic invention to 3-dimensions, in which the centroid pixel (in gray) is surrounded by 26 nearest neighbors (called $1^{st}$ neighbors), according to an embodiment of the invention.

Figure 8P:
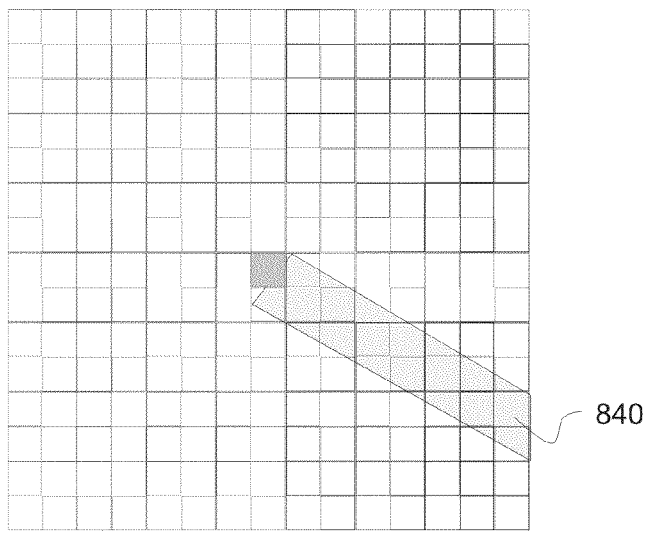

FIG. 8P illustrates a wide vector (the shaded area) that intersects more pixels than a line vector, thus bringing more pixels' values into the vector value computation, according to an embodiment of the invention.

Figure 8Q:
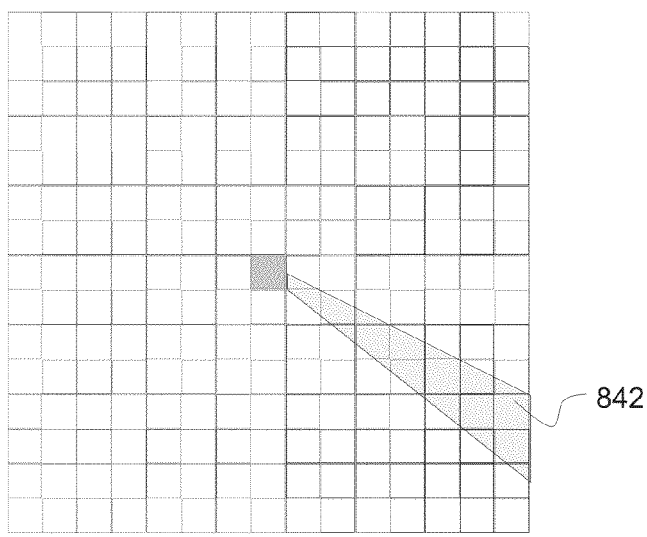

FIG. 8Q illustrates a wide vector with non-constant width in which the number of pixels used in calculating the vector value is a function of the distance from the centroid pixel, according to an embodiment of the invention.

Figure 9:
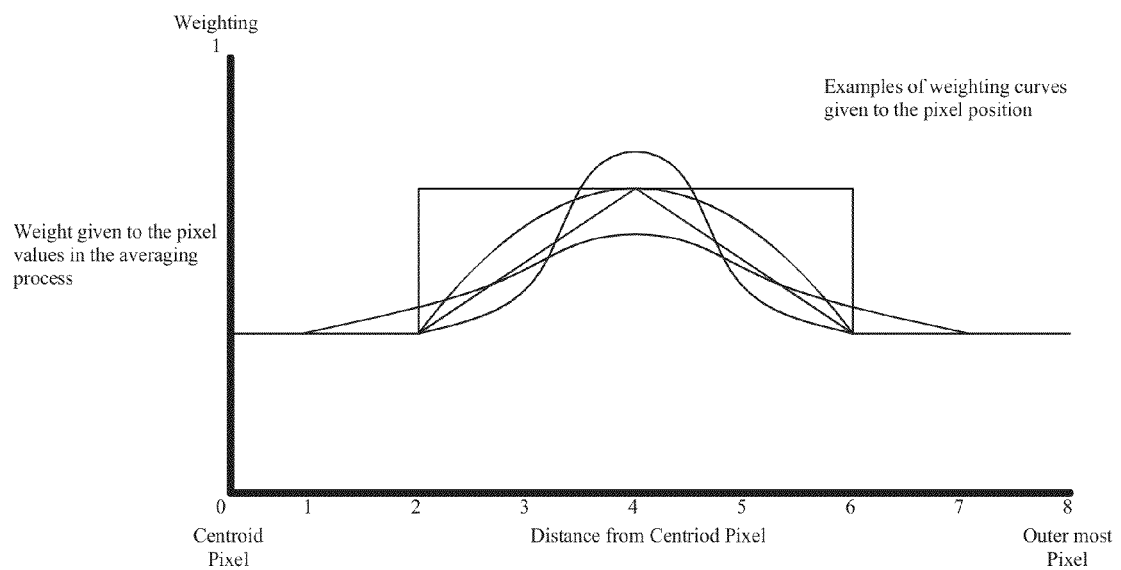

FIG. 9 shows example weighting functions that can be used to compute weighted average vector values, according to an embodiment of the invention.

FIGS. 10A-10D illustrate ways in which pixel values may be adjusted based on scores, showing a typical 50% adjustment factor, according to embodiments of the invention.

Figure 11:
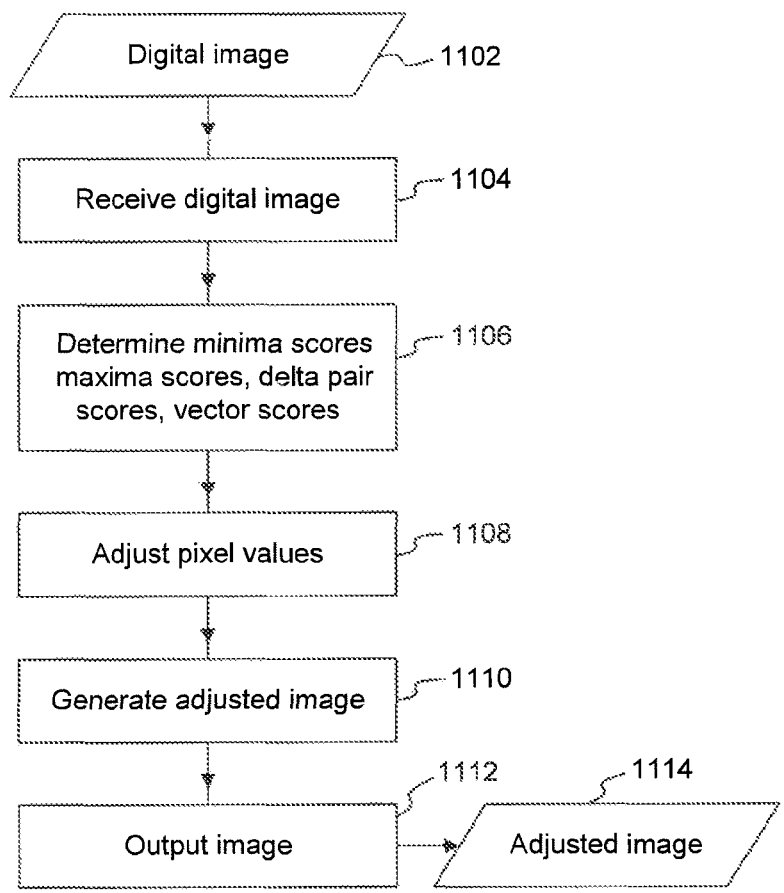

FIG. 11 is a flow chart illustrating a method for generating a scored pixel adjustment of a digital image, according to an embodiment of the invention.

Figure 12:
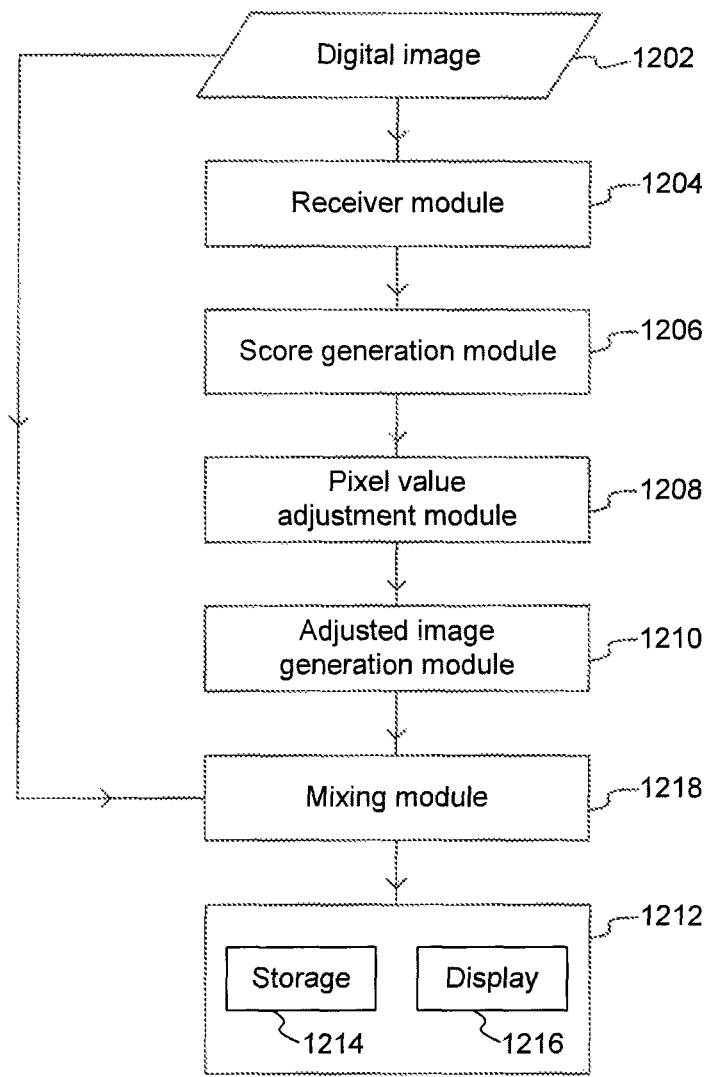

FIG. 12 is a block diagram illustrating a computer implemented system for generating a multi-scored pixel adjustment of a digital image, according to an embodiment of the invention.

Figure 13:
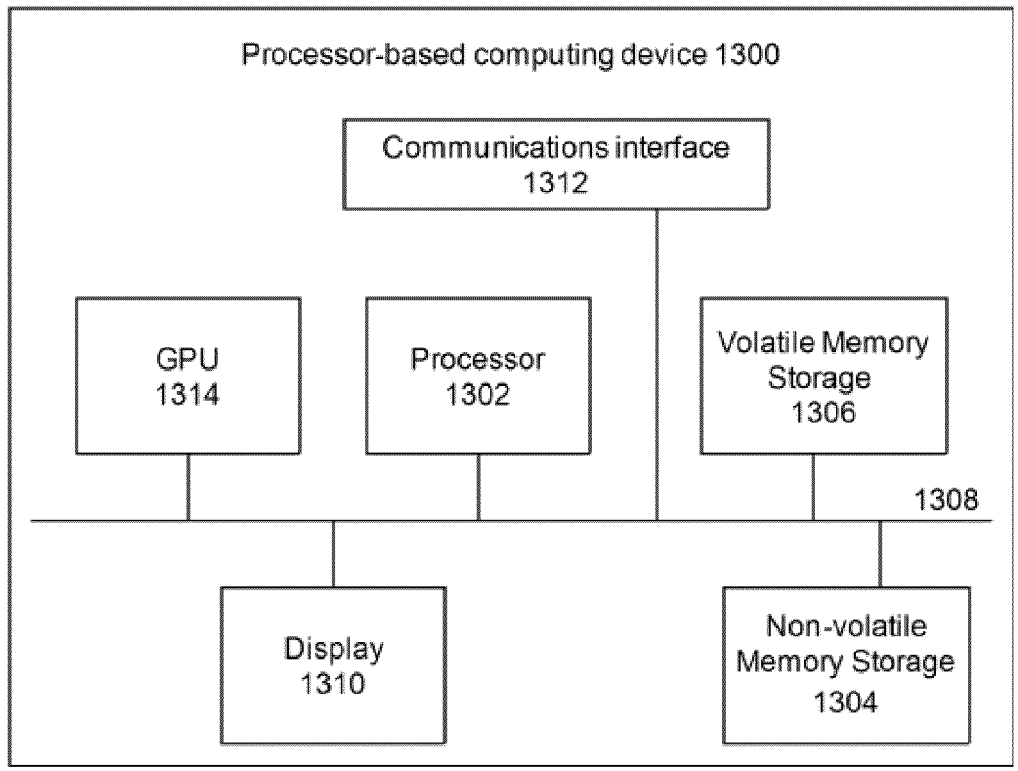

FIG. 13 is a block diagram of a processor based computing device in which embodiments of the invention may be implemented.

Figure 14:
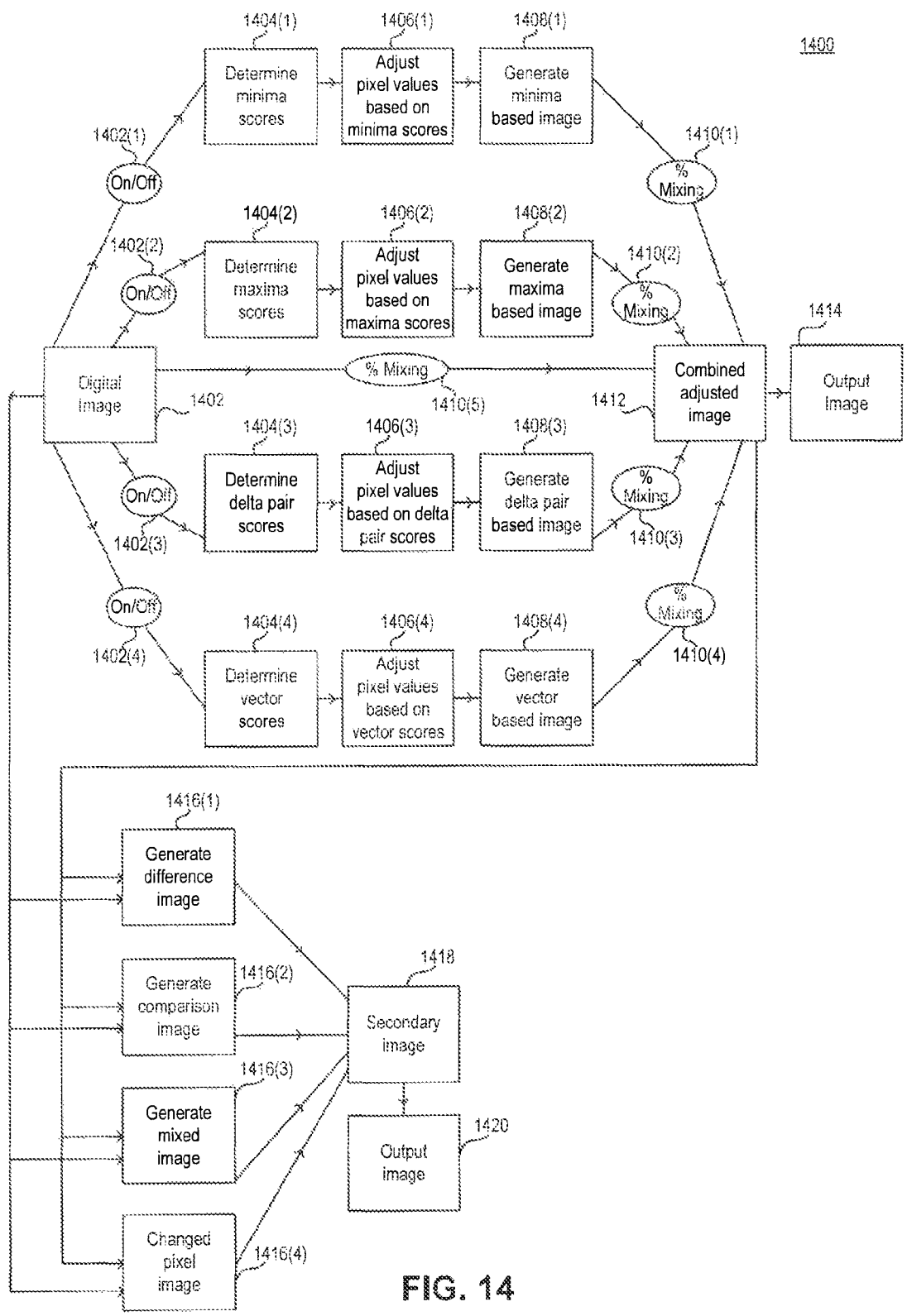

FIG. 14 illustrates a system configured to generate a combined adjusted image and one or more secondary images, according to an embodiment of the invention.

Embodiments are described below with reference to the accompanying drawings. In the drawings, like reference numbers generally refer to identical or functionally similar elements. Additionally, the leftmost digit(s) of a reference number generally identifies the drawing in which the reference number first appears.

DETAILED DESCRIPTION OF THE INVENTION

It is noted that reference in this specification to "one embodiment," "an embodiment," "an example embodiment," etc., indicate that the embodiment described may include a particular feature, structure, or characteristic, but an embodiment may not include the particular feature, structure, or characteristic. Moreover, such phrases are not necessarily always referring to the same embodiment. Further, when a particular feature, structure, or characteristic, is described in connection with an embodiment, it is submitted that it is within the knowledge of one skilled in the art to affect such feature, structure, or characteristic, in connection with other embodiments.

The present invention is directed to machines, systems, methods, and computer readable storage media, for generating scored pixel adjusted digital images (i.e., enhanced digital images). This new and novel invention is useful, for example, for detecting medical anomalies, disease diagnoses, improved imagery, and to obtain new and undiscovered information from existing images. Prior to a detailed discussion of embodiments, a brief overview is provided followed by a set of definitions.

An embodiment of the present invention operates as follows. The system includes pixel examination modules configured to identify corresponding minima pixels, maxima pixels, delta pairs, and vector pixels of a digital image to be processed. One or more pixel examination modules are selected based on user input or default settings, for example. Those selected modules operate to assign a pixel-by-pixel score to pixels in the image. Corresponding scores are then assigned based on the identified minima pixels, maxima pixels, delta pairs, and vectors pixels. New pixel values (e.g., greyscale or color) are then assigned based on the assigned scores. The new values are determined through adjustment (or other algorithms as explained in detail herein). The new values are used to generate one or more new images. The new images may then be combined, or combined with the original image, to generate a new combined adjusted image to reveal faint or imperceptible characteristics, data, and features from the original image. The new combined adjusted image may then be displayed, transmitted, stored, or the like. Refinement of the new combined adjusted image may then be carried out to further reveal faint or imperceptible data and features from the original image.

DEFINITIONS

This section provides a set of definitions that will be will be used throughout the remainder to this description. The definitions are organized in a logical order that parallels the presentation of topics in the following sections.

Digital image: A numeric representation of a two (or three) dimensional image. In this descriptions digital image refers to a raster image (also called a bitmap image). This raster image has a finite set of elements, called picture elements or pixels. A two-dimensional digital image includes a fixed number of rows and columns of pixels. The rows and columns of pixels form a regular grid that represents the image. Each array element of that grid contains the intensity values of the associated pixel. A three-dimensional digital image has rows, columns and sheets. For simplicity, descriptions of the invention will be limited to two-dimensions unless otherwise noted.

Digital Movie: A time sequence of digital images. Each image is commonly referred to as a frame. This may also be thought of as digital image with an extra dimension. A movie of two-dimensional images would have three total dimensions; a movie of three-dimensional digital images would have four. For simplicity, descriptions of the invention will not be for movies, unless otherwise noted.

Pixel: A pixel is the smallest individual element in an image, containing values that represent the intensity (also called brightness) of each given color at any specific point. Each pixel is most simply characterized by its location in the 2 dimensional plane (denoted by Cartesian coordinates, angular coordinates, etc.) and one or more intensity values. In a two dimensional digital image, a pixel represents a small square or rectangle in the image. For example, an image produced by a 300 dots per inch scanner would have pixels of $1/300^{th}$ of an inch by $1/300^{th}$ of an inch. In a three dimensional digital image, a pixel represents a small cube or box. In a digital movie a pixel represents a square, rectangle, cube or box in a frame. Each frame represents a time slice. The size of that time slice is the time dimension of the pixel. For example, a movie with 60 frames per second has pixels $1/60^{th}$ of a second long in time.

Greyscale Image: A digital image in which each pixel contains a single value representing intensity information. Images of this sort, also called "black and white," are composed exclusively of shades of gray, varying from black at the weakest intensity to white at the strongest.

Greyscale Pixel: The smallest individual element in a greyscale image. Greyscale images are distinct from binary images in that while they only have a single value representing intensity, that value can take on a variable range unlike a binary pixel that takes on only two values (e.g., only 0 and 1).

Color Image: A digital image that includes color information for each pixel. It is normal to provide three colors (i.e., the intensity values for three colors) commonly red, green and blue.

Color Pixel: The smallest individual element in a color image. Typically each pixel is associated with three intensity values denoting the intensity of each of three colors, which are interpreted as coordinates in some color space. The RGB (red, green, blue) color space is commonly used in computer displays, but other spaces such as YCbCr, HSV are used in other contexts.

Pixel Value: A numerical value representing an image's intensity at the pixel's location. Greyscale images have a single value associated with each pixel and color images have typically three values associated with each pixel. For example, pixel value in an 8-bit image is typically stored as 8-bit integer (0 to 255). Thus, a color image would be stored using 24 bits per pixel.

Centroid Pixel: The center reference pixel examined for scoring and value adjustment.

Neighboring Pixels: A collection of pixels associated with a given pixel. For example, in a rectangular grid of pixels, a pixel is normally surrounded by eight nearest neighbor pixels (called $1^{st}$ neighbors). Similarly, a pixel will normally have sixteen next-nearest neighbors ($2^{nd}$ neighbors), twenty-four $3^{rd}$ neighbors, etc. The exceptions are pixels that are close to the edge of the picture and some of their neighbors would be outside of the image and thus don't exist.

Neighboring Non-Adjacent Pair: Two neighboring pixels (selected, for example, from the eight $1^{st}$ neighbors of a given pixel) that are not adjacent to one another.

Pixel Set: A collection of pixels associated with a given pixel. The eight $1^{st}$ neighbors surrounding a pixel is an example of a pixel set. Likewise, the $2^{nd}$ neighbors of a pixel constitute a pixel set. As a further example, a pixel set may be a collection of pixels closest to an edge pixel. A line of pixels (also called a pixel vector) is yet a further example of a pixel set. Sets can also be arbitrarily shaped clusters or curved vectors.

Pixel Cluster: Any defined pixel set used for scoring the centroid pixel. The terms "pixel set," "pixel cluster," "cluster," etc. may be used interchangeably.

Pixel Neighborhood: A region associated with a pixel that can be of a specific geometric shape (e.g., square, rectangle, oval, circle, etc.). A pixel neighborhood can encompass the eight $1^{st}$ neighbors, the sixteen $2^{nd}$ neighbors, an edge region, etc.

Pixel Comparison: Comparing the value of a given pixel with values of other nearby pixels to determine various relationships. For simplicity of description, examples are given assuming greyscale pixels that each have only a single value. As an example, the value of a given pixel can be compared with one of its eight $1^{st}$ neighbors to determine if it is more or less than that of the neighbor. As a further example, the value of a given pixel can be compared with one of eight of its sixteen $2^{nd}$ neighbors to determine if it is more or less than that of the $2^{nd}$ neighbor (see FIG. 8E). As a further example, the value of a given pixel can be compared with that of two other pixels to determine the relative ordering of the three respective values. Although examples have only been given with respect to greyscale pixels, many further comparisons can be made with other types of pixels, particularly color pixels.

Minima Pixel: A pixel having a value that is lower than that of all of two (or more) other non-adjacent neighboring pixels. As discussed above, the value being examined can be the single value associated with greyscale pixel or one of the values (or a function of all the values) associated with a color pixel.

Maxima Pixel: A pixel having value that is greater than that of all of two or more other non-adjacent neighboring pixels. As discussed above, the value being examined can be the single value associated with or greyscale pixel or one of the values (or a function of all the values) associated with a color pixel.

Relationship Deltas: The difference in value between a centroid pixel and another pixel (commonly an integer value based on the bit depth of the image).

Threshold: A real number, greater than or equal to zero, used to make comparisons. For example, in making comparisons to determine delta pair pixels certain embodiments require the difference between the values of the pixels being examined to be greater than a particular threshold.

Minima Score: A score associated with a centroid pixel that counts the number of times it is a minima pixel. For example, a centroid pixel's value can be compared with those of pairs of non-adjacent pixels selected from the eight $1^{st}$ neighbor pixels. There are twenty such pairs of non-adjacent pixels leading to twenty comparisons. The minima score is thus how many times the centroid pixel won the comparison (was less than both of the two non-adjacent pixels). There are many ways to define the minima score. For example, the comparisons can involve pairs of pixels selected from the 16 $2^{nd}$ neighbor pixels. In further examples, pairs of pixels can be chosen from a more general pixel neighborhood. The minima score can be defined with respect to comparisons involving pixel sets having any number of pixels. In other embodiments, the minima score can involve comparisons relative to a minima threshold as described below. In general, if there are M comparisons used to define the minima score, the value of the minima score lies in the range $\{0, M\}$.

Minima Threshold: A threshold associated with defining a minima score. When a minima threshold is defined, the minima score counts the number of comparisons with respect to which the pixel can be considered to be a minima pixel under the further constraint that the value of the pixel being examined is lower than that of all the other pixels used in the comparison by an amount that is greater than or equal to the minima threshold. There can also be a minima threshold that acts as an upper limit, where if the value of the pixel being examined is lower than all the other pixels used in the comparison by more than the threshold, that comparison isn't scored in a preferred embodiment.

Maxima Score: A score associated with a centroid pixel that counts the number of times it is a maxima pixel. For example, a centroid pixel's value can be compared with those of pairs of non-adjacent pixels selected from the eight $1^{st}$ neighbor pixels. There are twenty such pairs of non-adjacent pixels leading to twenty comparisons. The maxima score is thus how many times the centroid pixel won the comparison (was more than both of the two non-adjacent pixels). There are many ways to define the maxima score. For example, the comparisons can involve pairs of pixels selected from the 16 $2^{nd}$ neighbor pixels. In further examples, pairs of pixels can be chosen from an arbitrary pixel neighborhood. The maxima score can be defined with respect to comparisons involving pixel set having 2, 3, 4 N pixels. In other embodiments, the maxima score can involve comparisons relative to a maxima threshold as described below. In general, if there are M comparisons used to define the maxima score, the value of the maxima score lies in the range $\{0, M\}$.

Maxima Threshold: A threshold associated with defining a maxima score. When a maxima threshold is defined, the maxima score counts the number of comparisons with respect to which the pixel can be considered to be a maxima pixel under the further constrain that the value of the pixel being examined is higher than that of all the other pixels used in the comparison by an amount that is greater than or equal to the maxima threshold. There can also be a maxima threshold that acts as an upper limit, where if the value of the pixel being examined is greater than all the other pixels used in the comparison by more than the threshold, that comparison isn't scored in a preferred embodiment.

Delta Pair: Two pixels involved in comparisons to define a delta pair and its score. The two pixels in a delta pair may be chosen in many ways. For example, one pixel in a delta pair can be the centroid pixel being examined and a second pixel can be chosen from one of the eight $1^{st}$ neighbors surrounding the pixel being examined. In another example, one pixel in a delta pair can be the pixel being examined and a second pixel can be chosen from one of its sixteen $2^{nd}$ neighbors. In further examples, one pixel in a delta pair can be the pixel being examined and the second pixel can be chosen from one pixel in an arbitrary pixel neighborhood.

Delta Pair Threshold: A threshold used to define delta pairs. The delta pair threshold may be a positive or a negative threshold.

Delta Pair Movement (spread difference calculation): The centroid pixel and the pixel it is being compared to are not assigned delta pair status unless they have a difference in value greater than or equal to the delta pair threshold. The delta pair threshold may be positive or a negative threshold. The difference between the delta pair is the value of the difference for the assigned delta pair. The delta change can take on both negative (for negative delta pairs) and positive (for positive delta pairs) values. The delta pair change defines the movement of separation of the centroid pixel and its defined delta pair associated pixel is adjusted in value away from the assigned pixel.

Pixel Vector: For the purposes of this invention description, a pixel vector is a line segment that runs through a number of pixels (i.e., a pixel set). A pixel vector is characterized by the number of pixels in the set and the orientation of the set. In certain embodiments, a pixel vector can also have an associated width that describes the extent of the pixel vector in a direction perpendicular to the vector line segment. A pixel vector is associated with a centroid pixel at its end. In one embodiment, there are eight vectors per centroid pixel (the eight compass points N, NE, E, SE, S, SW, W, and NW) with a number of vector lengths assigned (for example, three pixels per vector). The eight compass point vectors run exactly through the middle of pixels and thus can be simply described as being, say, three pixels long. In an embodiment the length does not count the centroid pixel.

In further embodiments, a pixel vector can be in any direction. Vectors not on exact compass points tend to run through more pixels, cutting across some pixels near a corner or a side (instead of running right through the middle), thus involving a larger pixel set. The lengths of such vectors cannot be described simply as a pixel count but need to use the traditional geometric definition of length. This length need not be an integer. Whereas the simply defined compass point vectors (of, say, length 3 pixels) do not all appear to be the same length (the diagonal ones look longer), vectors in the more general case could have lengths that appear more consistent. Those lengths could still be defined as pixels (though meaning multiples of the width or length of a pixel. However, when the image is of a real object, it may be convenient to define the length of a pixel vector in inches or centimeters. If the image is 3-D, there are 26 ($3^3$−1) vectors that are analogous to the 8 ($3^2$−1) compass point vectors in 2-D (running only through the middle of pixels). Those vectors can be simply described as having a length equal to the number of pixels run through. However, just as with 2-D, there are an infinite number of other possible directions, where the vectors would run through more pixels and not necessarily right through the middle. The lengths of those vectors may be defined using traditional geometry and may even be in real terms such as centimeters. Analogously, a 4-D image has 80 ($3^4$−1) vectors that run exclusively through the middle of pixels. These can have lengths simply defined in terms of pixels. Vectors at odd angles can also be defined in terms of pixels, using the regular geometric definition of length but relative to the width (or other dimension) or a pixel. Time and distance are easily compatible when the distances are expressed in light-years. However, in the context of the present invention, since lengths of time are difficult to combine with spatial lengths, 4-D pixel vector lengths cannot be expressed in real terms that are easy to communicate. Any pixel vector can always be specified by enumerating the pixels in the vector using any convenient indexing system. For example, a pixel's location can always be specified by giving it's coordinates in an appropriate coordinate system.

Vector Value: A value assigned to a pixel vector. Comparisons involving vector values are useful in embodiments directed towards edge definition. A vector ends at the centroid pixel, and has a predetermined length, and usually has a direction specified by one of the compass directions N, NE, E, SE, S, SW, W, NW. For example, a vector chosen to have the direction E with length "m" (a positive integer) contains m pixels. If m=3 the vector will consist of pixels located at positions X=1, 2, 3 with the centroid pixel located at X=0. In the simplest case, a vector value is defined by taking the average of the values of pixels 1, 2 . . . m. However, the vector value may be computed using a weighted average or the pixel values where the pixels in the pixel set are not given equal weights.

Vector Score: A synonym for vector value.

Primary Vector: The "winning" vector. The vector whose value differs the most from the centroid pixel's value. In the simplest case, the values of each of the eight compass point vectors are compared and the vector whose average value is most different from the centroid pixel's value (positive or negative) is defined to be the primary vector.

Vector Based Centroid Pixel Adjustment: Typically, the centroid pixel's value is adjusted to increase the difference between it and the primary vector's value.

Pixel Score: The score used for pixel adjustment based on a comparison between pixels or between a centroid pixel and a vector. Typically, minimas and maximas have count scores, while delta pairs and vectors typically have value difference scores.

Scored Pixel: A pixel for which at least one pixel score has been defined.

Multi-Scored Pixel: A pixel for which more than one pixel score has been defined.

Adjusted Image: A new image that is generated by selecting a number of pixels from an existing image and adjusting the pixel values according to one or more scores.

Adjusted Pixel Value: A pixel value that has been adjusted according to one or more scores defined herein. A pixel value can be adjusted in a number of ways depending on the various scores that have been defined. For example, a pixel value can be adjusted using a function of the input value of the pixel and one or more pixel scores.

Minima Based Image: A new image that is generated from an existing image by assigning each pixel a minima score and adjusting a number of those pixels' values based on their minima scores and given adjustment parameters.

Maxima Based Image: A new image that is generated from an existing image by assigning each pixel a maxima score and adjusting a number of those pixels' values based on their maxima scores and given adjustment parameters.

Delta Pair Based Image: A new image that is generated by selecting a number of pixels from an existing image and adjusting the pixel values according to delta pair scores.

Vector Based Image: A new image that is generated by selecting a number of pixels from an existing image and adjusting the pixel values according to vector scores.

Combined Adjusted Image: A new image that is generated by combining two or more: minima based image(s) and/or maxima based image(s) and/or delta pair based image(s) and/or vector based image(s) and/or the original image. The value of each pixel in the combined adjusted image is a weighted average of the corresponding pixels in the images being combined. For example, each pixel's value in a combined adjusted image might be 80 percent from one vector based image and 20 percent from a different vector based image.

Difference Image: A new image that is generated by subtracting the values of the adjusted image from the original image.

Comparison Image: A new image that is a side-by-side comparison of the adjusted image and the original image.

Changed Pixel Image: A new image that shows those pixels that were adjusted. As an example, all adjusted pixels could be white while all adjusted pixels could be black.

Secondary Image: A category of types of images comprised of difference images, comparison images and adjusted pixel images.

Adjustment Function: A function used to adjust a pixel's value. When integer bit values are normalized, an adjustment function can be chosen to take an input value "r" given in the range {0, 1} and return a corresponding adjusted pixel value "s" also lying in the range {0, 1}. In general, the function can be specified using a general function "T" as: s=T(r, c) wherein the parameter "c" is related to one or more scores defined herein. In accordance with embodiments of the present invention, many adjustment functions use the score information "c." In one embodiment, the adjustment function is a power function. For example, the input value "r" can be transformed to the new value "s" according to the function:

$$s=r(1-r)*c^p*f$$

where "p" is a user chosen exponent and "f" is a normalizing factor that depends on "p" and the maximum value of "c." In an example, "p" can be chosen to be any positive real number. The factor "f" can be chosen so that the adjusted value "s" will lie within the interval {0, 1}. This particular choice assumes that the input value "r" also lies within the interval {0, 1}. For example, if the maximum value of the count "c" is "cmax" then the normalizing factor is chosen to be: $f=1/(cmax)^p$.

In another example embodiment, the adjustment function can be chosen to be:

$$s = r - r*c^p*f$$

It is to be appreciated that any reasonable function that depends on the score "c" and transforms the variable "r" lying in the interval {0,1} into a new value "s" that also lies in the interval {0,1} can be used. All such adjustment functions are considered to be within the range of disclosed embodiments. In embodiments, "c" can be chosen to be one of the scores (i.e., the minimum score, the maximum score, etc.)

Multi-Scored Pixel Adjustment: An adjusted pixel value that has been adjusted using more than one score. A pixel value can be adjusted in a myriad of ways. For example, a value can be first adjusted using one score to generate a first adjusted value. The value can then be adjusted using a different score to generate a second adjusted value. The two adjusted values can then be combined in multiple ways to generate a multi-score pixel adjustment. For example the first and second adjusted values can be added, subtracted, etc. Similarly, the parameter "c" discussed above with respect to the adjustment function can be defined to be various sums and differences of the various scores.

Pixel Adjustment Movement: The way in which maxima, minima, delta pair, and vector pixel values are increased and decreased. When normalized the value of a pixel is a real number in the range {0, 1}. The value "r" divides this range into two gaps, the first being the range {0, r} and the second being {r, 1}. In general, pixel values are adjusted by increasing the value of a maxima pixel and decreasing the value of a minima pixel. The amount of increase or decrease is determined as a percentage of one of the ranges {0, r} or {r, 1}. For example, if the value of a maxima pixel happens to be 30% then r=0.3. If this value is to be adjusted by 50% of the range {0.3, 1.0} it will be adjusted to be increased to the value s=0.65. As another example, suppose a maxima pixel has value r=0.9 and it is adjusted by 50% of the range {0.9, 1.0} it will be increased to the adjusted value s=0.95. Similar adjustments are defined with respect to minima pixels. For example, if a minima pixel has the value r=0.3 and it is adjusted so as to be decreased by 50% of the range {0, 0.3} is will be decreased to have the value of s=0.15—and so on.

Down Sampling: A process whereby a block of pixels is replaced by an average effective pixel. For example, a given pixel along with its eight nearest neighbors forms a block of nine pixels. This block of nine pixels can be averaged to yield an average effective pixel.

Down Sampled Image: An image resulting from down sampling. For example, an image can be divided into blocks of nine pixels. Then by the process of down sampling, each block of nine pixels can be replaced by a single effective pixel have a corresponding effective value given by the average of the starting nine respective values. In an embodiment, all of the various pixel scores and vector scores can be defined for a down sampled image.

Jumping the Gap: A process in which a pixel or group of pixels is compared with another disjoint pixel or group of pixels. For example, if a given pixel is compared with pixels chosen from the collection of sixteen $2^{nd}$ neighbors but no comparisons are made involving the eight $1^{st}$ neighbors the process is said to involve "jumping the gap." The term jumping the gap in this case means the eight $1^{st}$ neighbor pixels form a gap between the pixel being examined and the sixteen $2^{nd}$ neighbors.

Disjoint Pixel Sets: Two or more sets of pixels that have no pixels in common and do not touch—i.e., are separated by one or more pixels.

Noise Characterization Based on Scores: A process in which noise is characterized and removed from images based on pixel scores. Various scores can be used to characterize noise. For example it has been found that noisy pixels can have scores that are higher or lower than average.

Auxiliary score image: An auxiliary score image, is an image that is the result of a minima, maxima, delta pairs, or vector scores determination. In other words, the result of each score determination can be output as an image.

Examples of Scored Pixel Adjustments of Images

Various embodiments are disclosed for generating an enhanced image from a digital image according to the present invention. An example image can be can be an image generated by an X-ray, CT-scan, MRI, ultrasound, or other medical imaging diagnostic procedure. While the disclosed embodiments relate to new image processing techniques for early detection of medical anomalies and disease diagnoses, the present invention is not limited to the medical field. The disclosed systems, methods, and computer program products can be applied to enhance any digital image regardless of its source, subject matter or function.

A digital image is a numeric representation of a two dimensional image such as a photograph. In this description, a digital image refers to a raster image (also called a bitmap image). This raster image has a finite set of digital values, called picture elements or pixels. A digital image includes a fixed number of rows and columns of pixels. The rows and columns of pixels form a regular grid that provides a numerical representation of the image.

A digital image includes a collection of pixels each with a corresponding intensity. A pixel is the smallest individual element in an image, containing values that represent the brightness (also called intensity) of a given color at any specific point. Each pixel is characterized by its location denoted by {X, Y} coordinates and one or more intensity values. Greyscale images have a single intensity (i.e., single channel) associated with each pixel and color images have typically three values (i.e., three channels) associate with each pixel. An intensity value is typically stored in as an integer. For example, each value can be stored as an eight bit integer. Thus a color pixel would be associated with 24 bits per pixel.

The disclosed embodiments are described as pertaining to greyscale images having a single value associated with each pixel for simplicity of description. It should be apparent to persons of ordinary skill in the art, however, that the disclosed embodiments can be readily generalized to pertain to color images as well. Furthermore, the disclosed embodiments can also be further generalized to pertain to 3-D images, or even 4-D images (including time). Thus, a pixel's neighborhood may be considered to include nearby pixels in all dimensions of space and time. This expands the invention to cover things such as MRIs and movies. Such embodiments are thus considered to be within the meaning and range of equivalents of the disclosed embodiments, based on the teaching and guidance presented herein.

All types of color and value adjustments are possible. For example, a medium brown colored pixel could be changed in greyscale amplitude to a light brown pixel or a dark brown pixel (or any value in between) while retaining its color hue. This can be accomplished using a lookup table, a dual pixel amplitude of greyscale value and color assignment, or other techniques as would become apparent to a person having ordinary skill in the art. A red pixel can be assigned a amplitude value anywhere from dark red to the brightest red. In effect, a color retains its hue if the relative values of its color components are maintained. In addition, colors can be changed by individually changing the relative values of the color components as is known in the art.

The disclosed embodiments represent new diagnostic techniques that are distinct from traditional medical imaging approaches. The power of the invention can be best grasped by consideration of images that have been enhanced by various embodiments. The following examples are provided to show the remarkable results of various embodiments and set the stage for an in-depth discussion of detailed embodiments.

Figure 1A:
FIGS. 1A and 1B illustrate a raw X-ray image and the corresponding adjusted image based on a scored pixel adjustment, according to an embodiment of the invention.
Figure 1B:

FIGS. 1A and 1B illustrate a raw X-ray image and corresponding adjusted image, according to an embodiment of the invention. FIG. 1A is a raw X-ray image of a child's hand with a birth defect (six fingers on one hand). FIG. 1B illustrates a scored pixel adjustment of the starting image. The adjusted image exhibits considerable enhancement and was generated according to an embodiment of the present invention. Feature 102 in FIG. 1B shows clear enhancement of the bone structure as compared to the raw image of FIG. 1A.

Figure 1C:
FIG. 1C illustrates an adjusted image based on maxima pixels detected from the raw image of FIG. 1A, according to an embodiment of the invention.

FIG. 1C illustrates adjusted image based on maxima pixels detected from the raw image of FIG. 1A, according to an embodiment of the invention. As discussed in detail in the definitions section and elsewhere, the maxima scores used to generate the image of FIG. 1C is only one of many pixel scores. Note that in this example, the flesh outline is more pronounced that in the example of FIG. 1B.

Figure 1D:
FIG. 1D illustrates an adjusted image based on minima pixels detected from the raw image of FIG. 1A, according to an embodiment of the invention.

In another example, FIG. 1D illustrates a adjusted image based on minima pixels detected from the raw image of FIG. 1A, according to an embodiment of the invention. As will be discussed in greater detail below, the consideration of minima pixels is only one of many ways to characterize and adjust an image. In this example, the adjusted image does not appear quite as clear as, for example, the image based on maxima pixels in FIG. 1C. When used to adjust other types of images, however, the situation may be reversed and the minima pixels may contain more useful information. The disclosed embodiments provide a wide range of ways to adjust an image. Much information can be revealed by considering the many different ways to adjust an image. In certain embodiments, it is also advantageous to combine the various adjustment techniques to yield composite images, for example.

Figure 2A:
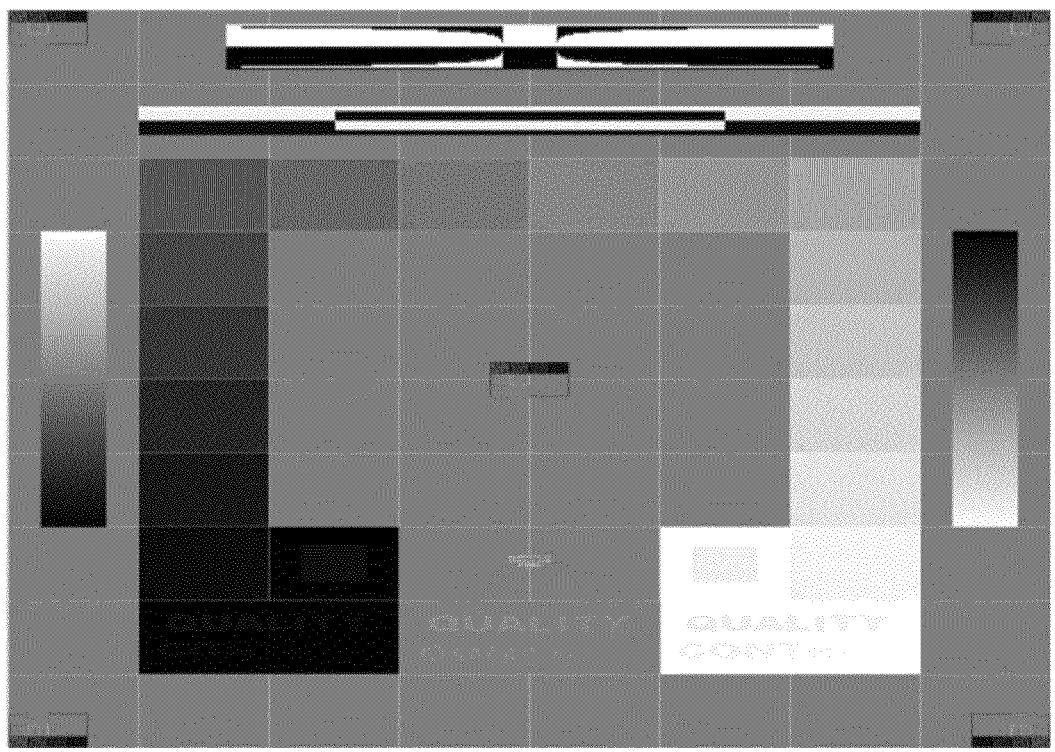
FIGS. 2A and 2B illustrate a test pattern before and after adjustment, according to an embodiment of the invention.
Figure 2B:
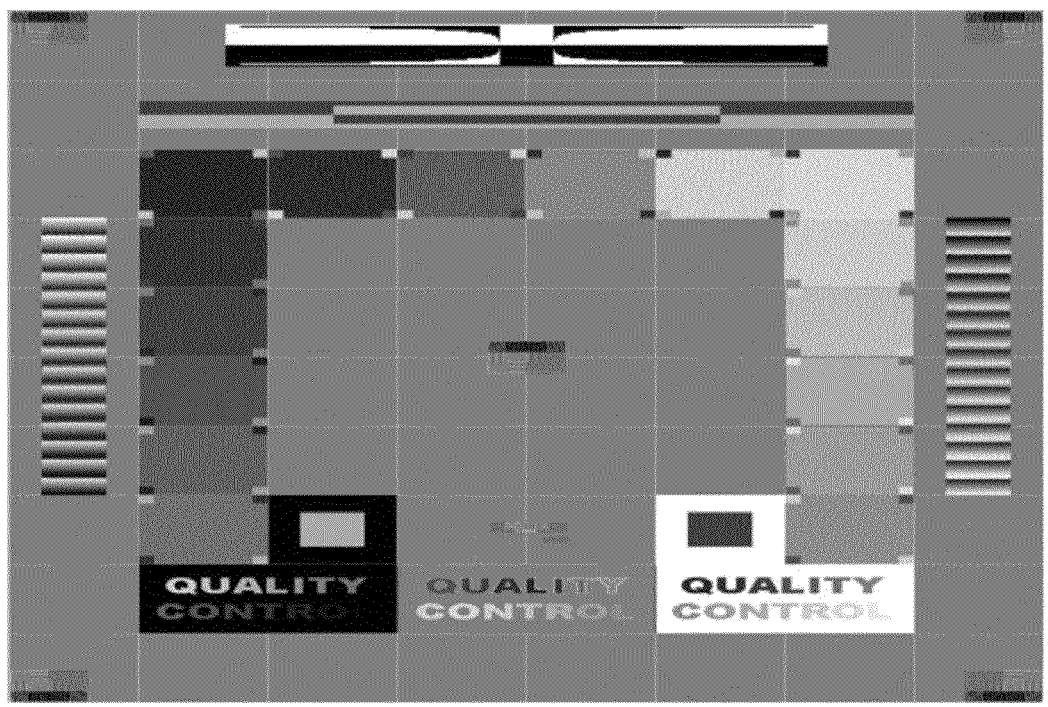

FIGS. 2A and 2B illustrate a test pattern before and after adjustment according to an embodiment of the invention. The enhanced image of FIG. 2B is based on delta pair scores detected from the raw image of FIG. 2A. The enhanced image of FIG. 2B shows considerable enhancement over that of FIG. 2A.

FIGS. 3A and 3B respectively illustrate a raw DNA bead image before and after image adjustment, respectively, according to an embodiment of the invention. Considerable enhancement is shown in FIG. 3B. The images of FIGS. 3A and 3B are shown slightly magnified in FIGS. 3C and 3D respectively. Image 3C contains an area near the lower light corner that is darker than the rest of the image. Areas such as this limit the density of DNA beads that can be seen on an image and are an example of the resolution limit of the unenhanced image. FIG. 3D indicated that there is no such dark area in the corresponding location in the lower right corner indicating that the resolution limit has been increased. Thus, due to the image enhancement of FIG. 3D, more of the image is usable and therefore the maximum density of DNA beads that can be seen is increased. These results show that image enhancement based on disclosed embodiments holds great promise for DNA analysis. FIGS. 3B and 3D are based on minima and maxima scores detected from the original images FIGS. 3A and 3C FIGS. 4A and 4B, 4C respectively illustrate a mammogram image before and after image adjustment, according to an embodiment of the invention. FIG. 4A is a conventional, albeit state of the art, image from a mammogram analysis system. It has soft edges to the detail and is not clearly defined. FIG. 4B illustrates the same mammogram image after processing according to an embodiment of the invention, which highlights ducts, veins, and other details not previously recognizable using conventional techniques. Thus, processing existing or new images according to embodiments of the present invention can enable radiologists to diagnose medical anomalies differently. FIG. 4B reformation (i.e., adjusted) image is based on vector scores detected from the original image FIG. 4A. Similarly, FIG. 4C illustrates the mammogram image after processing according another embodiment of the invention, and shows vein outlines based on vector scores as an auxiliary score image.

An auxiliary score image, is an image that is the result of a score determination, for example as produced by any one of modules 1404(1), 1404(2), 1404(3) or 1404(4). In other words, the result (not shown) of each determination module can be a output as an image.

FIG. 4D is a conventional, albeit state of the art, X-ray image of the chest. FIG. 4E illustrates the same X-ray after processing according to an embodiment of the invention and has more definition and clarity to the subject matter. This example provides further evidence that the embodiments of the invention enable the viewing of images in far more detail than the current state of the art. FIG. 4E reformation image is from the original image FIG. 4D. Based on a different unique set of vector scores than those used in FIGS. 4A and 4B. These results illustrate yet another application of disclosed embodiments to the analysis and diagnosis of medical images.

Discussion of Exemplary Embodiments

FIGS. 5 and 6 illustrate a collection of various pixel-level manipulations associated with various disclosed embodiments. Each pixel is assumed to be associated with a certain neighborhood, which is a region associated with a pixel that can be of a specific geometric shape (e.g., square, rectangle, etc.). A pixel neighborhood can encompass the eight $1^{st}$ neighbors, the sixteen $2^{nd}$ neighbors, an edge region, etc.

The pixels in a given pixel neighborhood are called neighboring pixels. The neighboring pixels are a collection of pixels associated with a given pixel. For example, in a rectangular grid of pixels, a pixel is usually surrounded by eight $1^{st}$ neighbor pixels. In a second example, a pixel is usually surrounded by sixteen $2^{nd}$ neighbors. The exception is when a pixel is too close to the edge of an image and some of its neighbors are outside the image and thus don't exist.

A pixel neighborhood is an example of a pixel set. A pixel set is a collection of pixels associated with a given pixel. The eight $1^{st}$ neighbors surrounding a pixel, that is sufficiently distant from an edge of an image, is an example of a pixel set. Likewise, the sixteen $2^{nd}$ neighbors surrounding a pixel, that is sufficiently distant from an edge of an image, is a further example of a pixel set. As a further example, a pixel set may be a collection of pixels closest to an edge pixel. A linear line of pixels (also called a pixel vector) is yet a further example of a pixel set. Sets can also be arbitrarily shaped clusters.

In the examples of FIGS. 5 and 6, a given pixel 502 is considered to be the centroid pixel surrounded by a collection of eight $1^{st}$ neighbor pixels. Pixels 504 and 506, for example, are $1^{st}$ neighbors of pixel 502. Each square, containing 9-boxes, in FIG. 5 represents a central pixel (e.g., pixel 502) surrounded by eight $1^{st}$ neighbors.

The following discussion relates to pixel comparisons in which the value of a given pixel is compared with the values of other pixels to determine various relationships. As an example, the value of a given pixel can be compared with one of its eight 1st neighbors to determine if it is larger or smaller than that of the neighbor. As a further example, the value of a given pixel can be compared with one of its sixteen $2^{nd}$ neighbors to determine if it is larger or smaller than that of the $2^{nd}$ neighbor. As a further example, the intensity of a given pixel can be compared with that of two other pixels to determine the relative ordering of the three respective values. Although examples have only been given with respect to greyscale pixels, many more comparisons can be made with color pixels.

Each square containing 9 boxes in FIGS. 5 and 6 represents a possible pixel-level comparison that can be carried out to compare the value of a given pixel with various combinations of its neighbors. Boxes in group 508, for example, illustrate comparisons between a centroid pixel (524) and two of its neighbors, 526 and 528. In all comparisons, the centroid pixel being examined (e.g., 524) has a dark shading while the pixels to which it is being compared (e.g., pixels 526 and 528) have a lighter shading. Pixels that are not involved in a particular comparison (e.g., 530) are not shaded.

The various comparisons illustrated in FIGS. 5 and 6 can be divided into two groups. FIG. 5 illustrates the first group 508 in which the centroid pixel is compared with two non-adjacent $1^{st}$ neighbors, while in the second group 610 of FIG. 6, a given pixel is compared only with a single neighbor. Comparisons involving pairs of pixels 508 are involved with the determination of the minima score, and the maxima score. These are defined as follows.

A minima pixel is a pixel whose value that is lower than those of two or more other pixels. This minima calculation may be based on a threshold. That is, for a pixel to be a minima it must not only have a value less than all the other pixels it is being compared to but it must also meet the threshold requirement. As discussed above, the value being examined can be the single value associated with greyscale pixel or one of the values (or averaged values) associated with a color pixel.

A maxima pixel is a pixel whose value that is greater than those of two or more other pixels. This maxima calculation may be based on a threshold. That is, for a pixel to be a maxima it must not only have a value greater than all the other pixels it is being compared to but it must also meet the threshold requirement. As discussed above, the value being examined can be the single value associated with or greyscale pixel or one of the values associated with a color pixel.

The four pixel comparisons in the group labeled 512 of FIG. 5 are similar to comparisons used to compute traditional mathematical derivatives. In such comparisons, a given pixel is compared with two of its neighbors in such a way that the pixel and its two neighbors all lie along a line as seen, for example, with pixels 524, 526, and 528. The scores computed in disclosed embodiments, however, are more general than those found in the computation of traditional derivatives. For example, in group 514 a given pixel is compared with two neighboring corners that are not along a line (as was the case in group 512). Group 518 illustrates comparisons involving two neighboring edge pixels that do not lie along a line (as was the case with 524, 526, and 528). Group 516 presents a further collection of comparisons involving a pixel with one corner and one edge pixel.

The collection of twenty comparisons illustrated in group 508 of FIG. 5 can all be applied to a pixel being examined to determine the minima score and the maxima score. These are defined as follows.

A minima score is a score associated with a centroid pixel that counts the number of comparisons for which the pixel is a minima pixel. For example, a pixel value can be compared with that of a pair of non-adjacent pixels selected from the eight $1^{st}$ neighbor pixels. There are twenty such pairs leading to twenty comparisons. The minima score is thus an integer value that lies in the selected range $\{0, 20\}$. There are many ways to define the minima score. For example, the comparisons can involve pairs of pixels selected from the 16 $2^{nd}$ neighbor pixels. In further examples, pairs of pixels can be chosen from an arbitrary pixel set. In addition, the minima score can be defined with respect to comparisons involving pixel sets having 2, 3, 4, ... N pixels. In further embodiments, the minima score can involve comparisons relative to a minima threshold as described below. In general, if there are M comparisons used to define the minima score, the value of the minima score lies in the range $\{0, M\}$.

A minima threshold is a threshold associated with defining a minima score. When a minima threshold is defined, the minima score counts the number of comparisons with respect to which the pixel can be considered to be a minima pixel under the further constraint that the value of the pixel being examined is lower than those of the two other pixels used in the comparison by an amount that is greater than or equal to the minima threshold.

A maxima score is a score associated with a centroid pixel that counts the number of comparisons with respect for which the pixel is a maxima pixel. For example, a pixel value can be compared with that of a pair of non-adjacent pixels selected from the eight $1^{st}$ neighbors. There are twenty such pairs leading to twenty comparisons. The maxima score is thus an integer value that lies in the selective range $\{0, 20\}$. There are many ways to define the maxima score. For example, the comparisons can involve pairs of pixels selected from the 16 $2^{nd}$ neighbor pixels. In further examples, pairs of pixels can be chosen from an arbitrary pixel set. In addition, the maxima score can be defined with respect to comparisons involving pixel set having 2, 3, 4, ... N pixels. In farther embodiments, the maxima score can involve comparisons relative to a maxima threshold as described below. In general, if there are M comparisons used to define the maxima score, the value of the maxima score lies in the range $\{0, M\}$.

A maxima threshold is a threshold associated with defining a maxima score. When a maxima threshold is defined, the maxima score counts the number of comparisons with respect to which the pixel can be considered to be a maxima pixel under the further constraint that the value of the pixel being examined is lower than those of the two other pixels used in the comparison by an amount that is greater than or equal to the maxima threshold.

In alternative embodiments, various subsets of pair comparisons can be used, rather than all pixel pairs. The range of possible scores depends on the number of comparisons involved. In one example, the largest value of the maxima score would be 20 if the pixel being examined happened to be a local maximum in the traditional mathematical sense. The smallest value of the maxima score value would be 0. Similar statements apply to the minima score.

The comparisons of group 508 illustrated in FIG. 5 are a subset of the total possible number of comparisons that can be made between a centroid pixel and pairs or $1^{st}$ neighbors. In group 508, comparisons have only been considered involving pairs of non-adjacent pixels. A non-adjacent pair is a pair of pixels selected from the neighbors of a given pixel that are not adjacent to one another. The more general situation in which adjacent and non-adjacent pairs are considered is discussed in the following.

In general a first pixel in a pair can be chosen from a possible of 8 locations. The second pixel of a pair can then be chosen from the remaining 7 pixels to form a pair. In this way, the complete set of pairs includes 7*8/2=28 possible pairs. Of the total 28 possible pairs, only the 20 pairs involving non-adjacent pixels are considered in group 508. This choice of considering only 20 pairs was made for simplicity of illustration in FIG. 5. In various embodiments, all 28 possible comparisons can be used to generate the minima score, the maxima score, etc. In such embodiments, the range of the maxima or minima score would be 0 to 28.

The comparisons illustrated in group 610 of FIG. 6, involving comparison of a pixel's value with a single neighboring pixel, introduce new possibilities for defining various scores. In group 620 a pixel's value is compared with a single neighboring edge pixel and in group 622 a pixel's value is compared with a single neighboring corner pixel.

The two pixels in each of the boxes in FIG. 6 are called delta pairs. The two pixels in a delta pair may be chosen in many ways. For example, one pixel in a delta pair can be the pixel being examined and a second pixel can be chosen from one of its eight $1^{st}$ neighbors. In another example, one pixel in a delta pair can be the pixel being examined and a second pixel can be chosen from one of its sixteen $2^{nd}$ neighbors. In further examples, one pixel in a delta pair can be the pixel being examined and the second pixel can be chosen from one pixel in an arbitrary pixel neighborhood (discussed more fully in relation to FIGS. 8A-8F below).

In comparisons involving delta pairs it is useful to distinguish between negative delta pairs and positive delta pairs. A negative delta pair is a delta pair in which the second pixel in the delta pair has a value that is less than that of the pixel being examined by an amount that is greater than a threshold. A positive delta pair is a delta pair in which the second pixel in the delta pair has a value that is greater than that of the pixel being examined by an amount that is greater than a threshold.

Comparisons involving delta pairs are used to define delta pair scores. A negative delta pair score is a score associated with a pixel being examined that counts the number of associated negative delta pairs of which the pixel being examined is a part. A positive delta pair score is a score associated with a pixel being examined that counts the number of associated positive delta pairs of which the pixel being examined is a part.

FIG. 7A illustrates a vector of pixels that can be used to define various vector based scores. A pixel vector is a line segment that runs through a number of pixels (i.e., a pixel set). A pixel vector is characterized by the number of pixels in the linear set and the orientation of the set. A pixel vector is associated with a centroid pixel. In one embodiment, there are eight vectors per pixel (oriented along compass directions N, NE, E, SE, S, SW, W, NW). Many other orientations are possible as well as curved vectors (i.e., vectors including several linear segments that may have different orientations).

Comparisons involving vectors of pixels are useful in embodiments directed towards edge detection. In an example, a vector can be defined to terminate at a centroid pixel, have a predefined length, and to have a direction specified by one of the eight compass points N, NE, E, SE, S, SW, W, NW. The vector illustrated in FIG. 7A is has the compass direction NE. (Note that since the arrowhead points towards the centroid pixel, the vector "points" in the opposite direction from how we label it. Our vector labels refer to the side the vector is on, or the direction from the centroid pixel to the vector, not the direction the vector points.) A vector value is, in a simple embodiment, defined by taking the average of the value of pixels 1, 2, . . . m.

FIG. 7B illustrates a collection of vectors spanning the compass directions N, NE, E, SE, S, SW, W, NW. A vector chosen to have the direction E (horizontal to the right) in FIG. 7B with length m (a positive integer) contains m pixels. If m=2 the vector will consist of the pixels located one and two pixels to the right of the centroid pixel being examined.

FIG. 7C illustrates down sampling. The four pixels in the center of FIG. 7C are shaded. In some embodiments, it may be advantageous to average over these four inner most pixels to define an effective pixel. In such an embodiment, the image would be partitioned into blocks of pixels (like the four shaded pixels in FIG. 7C) that would be averaged to determine effective pixels. Similarly, blocks of 16 pixels (or 25, or 64, etc.) could be averaged to define effective pixel. The notion of averaging various pixel sets can be used to define all types of scores including minima scores, maxima scores, delta pair scores, and vector scores. Numerous scores can be defined by comparison between various effective pixels that have been determined by averaging over blocks of pixels in the same way that scores have been defined for individual pixels (this is discussed more fully with respect to FIGS. 8G-8H below).

Each such vector illustrated in FIG. 7C has an associated vector value. The primary vector is defined as the vector whose value is most different from that of the centroid pixel. Consideration of vector based comparisons in general and primary vectors in particular are useful in embodiments directed towards edge detection.

FIGS. 8A-8F illustrate "jumping the gap." Jumping the gap refers to when a pixel, or group of pixels, is compared with another disjoint pixel or group of pixels. For example, if a given pixel is compared to pixels chosen from the sixteen surrounding $2^{nd}$ neighbors, but no comparisons are made involving the $1^{st}$ neighbors, the process is said to jump the gap.

FIG. 8A illustrates a process in which a first pixel X is compared with a second pixel Y. This is called jumping the gap because the pixel marked O is not considered in the comparison. In this sense, a gap of one pixel is jumped.

FIG. 8B illustrates a process in which a first pixel X is compared with a second pixel Y while a gap of two pixels is jumped. In general, any size gap can be jumped.

The pixels marked X and Y in FIGS. 8A and 8B can be considered to be members of delta pairs. Thus, all of the previous discussion of delta pairs and delta pair scores can be extended over to include jumping the gap. Thus, all comparisons in FIG. 6 generalize as illustrated in FIGS. 8A and 8B.

Similarly, the comparisons shown in FIG. 5 (which are used to define minima pixels, maxima pixels, minima scores, and maxima scores) can be generalized to include jumping the gap as illustrated in FIGS. 8C and 8D.

FIG. 8C illustrates a pair of pixels, marked Y, that are to be compared with the pixel being examined, marked X. The pixels that are ignored (jumped) in the comparison are marked with an O.

FIG. 8D illustrates a similar situation in which a pair of pixels Y is defined relative to a pixel being examined X. In this case the pairs jump a gap of two pixels. The pixels that are ignored (jumped) in the comparison are marked with O's.

The concept of jumping the gap is very general. For example, if a given pixel is compared with pixels chosen from the collection of sixteen $2^{nd}$ neighbors but no comparisons are made involving the eight $1^{st}$ neighbors the process is said to jump the gap. This situation is illustrated in FIG. 8E and FIG. 8F. The centroid pixel is marked with an X and is the pixel being examined (i.e., the pixel for which a score is being determined). The sixteen $2^{nd}$ neighbors pixels are each marked with a Y. The eight $1^{st}$ neighbors (each marked with an O) represent a gap between the centroid pixel and the $2^{nd}$ neighbors.

Many more comparisons can be defined involving down sampling and jumping the gap. Such a situation is illustrated in 8F. Rather than the single centroid pixel of FIG. 8E, a set of four pixels (marked X) are examined. These four pixels can be averaged to generate an effective pixel for comparison with another set of pixels (marked Y). The four pixels marked Y can be averaged before the comparison is performed. In contrast the individual pixels marked X can each be compared with the individual pixels marked Y. This is an illustration of pixel comparisons in which one set of pixels can be compared with another set either individually or in comparisons involving averaging. The notion of jumping the gap is also illustrated in FIG. 8F by the set of pixels marked with O's, which are ignored in the comparison.

FIG. 8G illustrates a situation in which a pixel set 802 defines an effective pixel. The values of the four pixels in the set 802 are averaged to define an effective centroid pixel value. This effective pixel value can then be used to make comparisons with other single pixel values, or to make comparisons with other effective pixel values obtained by similar averages over other pixel sets. This is down sampling the image for the sake of minima, maxima, delta pair and vector comparisons.

FIG. 8H illustrates a situation in which a pixel set 804 is considered for defining an effective pixel. In this example, the values of the sixteen pixels in the set 804 are averaged to define an effective centroid pixel value. This effective pixel value can then be used to make comparisons with other single pixel values, or to make comparisons with other effective pixel values obtained by similar averages over other pixel sets.

FIG. 8I illustrates a situation in which a delta pair is defined with respect to a single centroid pixel 806 and an effective pixel obtained by averaging over two other pixels 808 and 809. In this example, the values of pixels 808 and 809 are averaged to give the value of the effective pixel. The effective pixel is then considered to be the second pixel in the delta pair. This example shows that the definition of a delta pair need not be confined to a comparison involving just two single pixels. In this example, the delta pair was defined to involve three pixels. By extension, delta pairs can be defined with respect to any two pixel clusters. In such a situation, the values of pixels in the first cluster are averaged to give a first effective pixel value. The values of the pixels in the second cluster are then averaged to give a second effective pixel value. Then the two effective pixels would be used to define the delta pair. As discussed above, the two pixel clusters may be disjoint and the delta pair can involve jumping the gap.

FIG. 8J illustrates comparisons for defining a maxima or minima pixel wherein various pixels are averaged to give effective pixels. In this case, the values of pixels 812 and 814 are averaged to give a first effective pixel value. Then pixels 816 and 818 are averaged to give a second effective pixel value. These first and second effective pixel values are compared with the single pixel 810 to define a maxima or minima score. In this example, pixel 810 can be evaluated to be a maxima pixel or a minima pixel. This example shows that the definition of minima scores and maxima scores need not be limited to comparisons of three pixels. In this example, five pixels are involved in the comparison. By extension, minima and maxima scores can be defined with respect to any three pixel clusters. In such a situation, the values of pixels in the first cluster are averaged to give a first effective centroid pixel value. The values of the pixels in the second cluster are then averaged to give a second effective pixel value. Finally, the values of the pixels in the third cluster are then averaged to give a third effective pixel value. Then the three effective pixels would be used to define minima scores and maxima scores. As discussed above, the three pixel clusters may be disjoint and the comparison can involve jumping the gap.

FIG. 8K illustrates a generalization of the concept of a vector. The line of pixels 820 illustrates single pixels 822 that define a vector of pixels. This line of pixels can be used to make comparisons. Such comparisons can include defining vector values, primary vectors, etc. As discussed above, blocks of pixels can be used to define average pixels. An additional situation is depicted in FIG. 8K in which single pixels such as 822 are considered along with neighboring pixels 824. The vector has effectively become wider (more pixels are averaged together). As defined above, a pixel neighborhood can be defined in a multitude of ways. In this case, the neighborhood of pixels along the line 820 is defined by pixels within the area subtended by lines 826 and 828 as indicated by the hatched pixels in FIG. 8K of which pixel 824 is an example.

FIG. 8L illustrates a vector comparison involving the value of a centroid pixel (in grey) and its value relative to the multiple vectors. In this embodiment one could determine if the centroid pixel is part of an increasing or decreasing vector slope. In this embodiment, the vectors are analyzed, compared to the centroid pixel and the centroid pixel may be adjusted.

FIG. 8M line 830 illustrates vectors at various angles not aligned with the regular eight compass points. Due to the odd angles, these vectors do not always run right through the middle of pixels. The vector values would be computed using a weighted average of the values for the pixels that the vector runs through. Any weighting function is allowed. For example, a pixel's weight in the averaging calculation could be proportional to the length of the vector segment that overlaps the pixel. When vectors are allowed that are not on the compass points, the length of the vector is more likely to be defined in geometric terms rather than a simple pixel count. FIG. 8M shows vectors that are, to the eye, very close to the same length (unlike, say FIG. 7B). Using vectors that are physically the same length (instead of simply having the same number of pixels) can be useful in any embodiment but is more typical when odd angles are used.

FIG. 8N illustrates vector images of differing lengths being combined. In an example, vectors of two, four, and six pixels can be combined. The images can be mixed in the percentage amounts desired. The advantage is that when different vector lengths reveal different details, combining them can produce a single, highly useful image.

FIG. 8O illustrates extending the basic invention to 3-dimensions in this example frames of a digital video image, multiple sequential images may be scored. Here, the centroid pixel (in gray) at 832 on section 834 has 26 $1^{st}$ neighbors shown on section 836 below and section 838 above. The sections could relate to image frames in a digital movie.

FIG. 8P illustrates another embodiment wherein the vector 840 is not a line, but is wide so as to intersect more pixels. In this case, the pixel's weight in the averaging process could be proportional to the area of the intersection of the wide vector and the pixel.

FIG. 8Q illustrates a wide vector 842 with non-constant width. Thus, the number of pixels used in calculating the vector value is a function of the distance from the centroid pixel. In the example pictured, the width of the line increases the farther it gets away from the centroid pixel, thus increasing the number of pixels considered in the outer regions. If this gives too much weight to the outer pixels, weighting, as described below for FIG. 9, could be used to compensate.

FIG. 9 illustrates another embodiment of the invention, the method by which the pixel values may be weighted (as in windows in FFT calculations) as a function of their distance from the centroid pixel. A weighted calculation can be applied to the pixel value averaging of each vector, for example, such that the middle range of pixels would have more of an effect on the averaging process. The weighting types of curves may vary. FIG. 9 shows only four curves but there are an infinite number of possibilities. The weighting curve need not be symmetric. For example, outer pixels may need more or less weight than inner pixels. In particular, the weight given to pixels can taper off to zero at greater distances from the centroid pixel. Thus, the vector does not end abruptly. Furthermore, jumping the gap can be accomplished by having the weight be zero at some distances. In combination with tapering and various vector angles, the gap would be more general—not having abrupt boundaries. This weighting also provides the invention a way of combining vector images. This allows for the enhanced image to have more and/or different definition.

A person of ordinary skill in the art will appreciate that a wide variety of comparisons can be generated using combinations of the concepts introduced so far (pixel comparisons, vector comparisons, averaging, jumping the gap, etc.). Likewise to each such comparison one or more scores can be defined. Such scores can be assigned to individual pixels, to sets of pixels, to vectors of pixels, etc. Therefore, all such comparisons and corresponding scores are intended to be within the meaning and range of equivalents of the disclosed embodiments, based on the teaching and guidance presented herein.

Figure 10A:
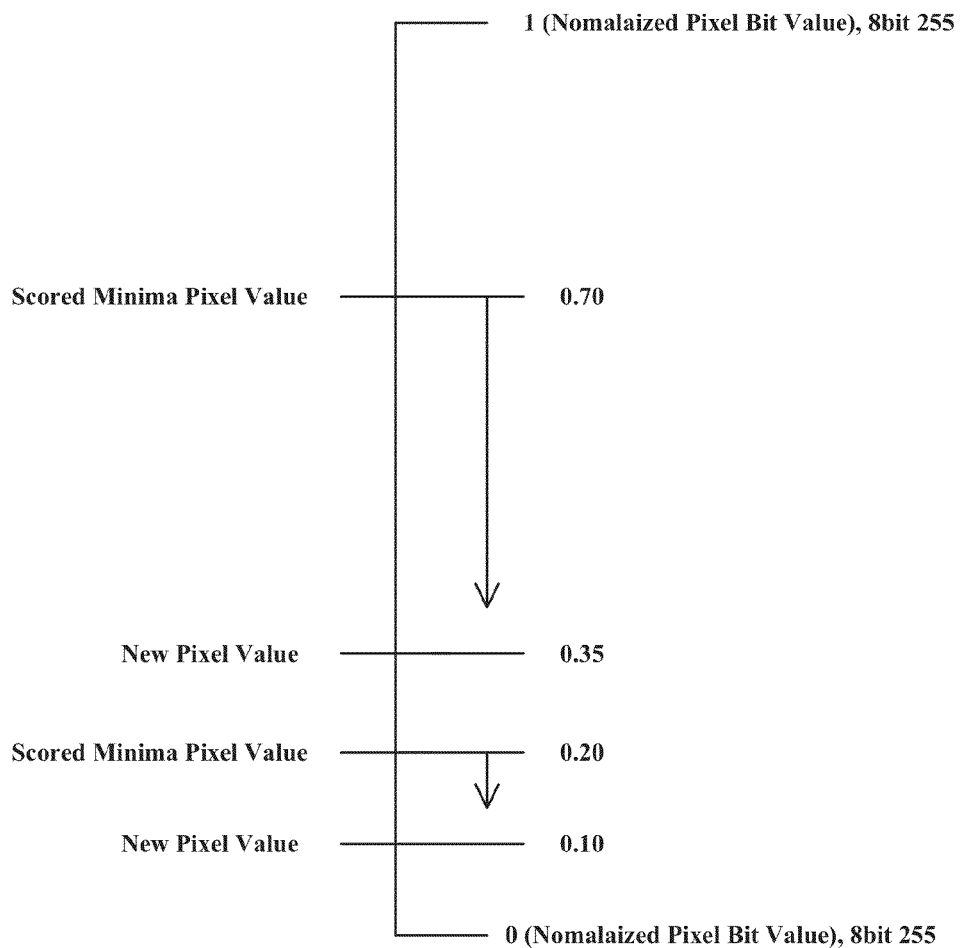
Figure 10B:
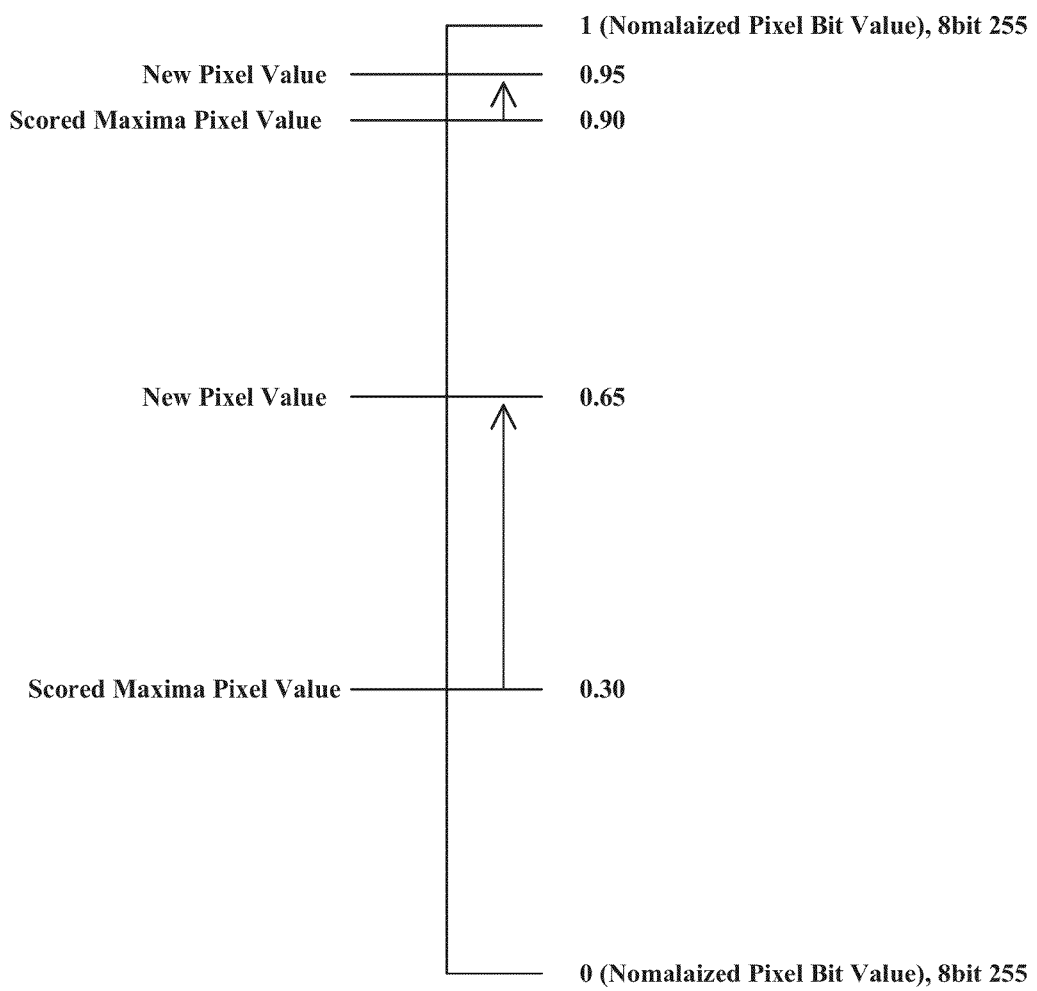

FIG. 10A and 10B illustrates how a centroid pixel value can be adjusted based on one or more scores utilizing minimas and maximas to define the centroid pixel scores. The vertical line in FIG. 10A illustrates the range $\{0, 1\}$ of values that can be associated with a pixel.

FIG. 10A illustrates the adjustment of minima pixels. In a first example the centroid pixel with starting value of 0.2. Generally a pixel having a minima score will be decreased. The decrease can be expressed as a percentage. The percentage decrease can be chosen to be a function of the score. For example, suppose the 0.2 value is chosen to be decreased by a factor of 0.5 times the interval $\{0.2, 0\}$, the new value will be 0.1 as shown. In another example, a pixel has a value of 0.7 and has a certain minima score. If in this example, the value is also to be decreased by a factor of 0.5 times the interval $\{0.7, 0\}$ it will be decreased to 0.35, as shown. These examples assumed a 50% decrease. This was an arbitrary choice. Any other percentage or change curve can also be chosen as determined by various algorithms. In further examples, the value need not decrease and may be increased by the same method. This would be the case for pixels with maxima scores.

In FIG. 10B the centroid pixel value is increased. This illustrates how a centroid pixel value can be adjusted based on one or more scores. The vertical line in FIG. 10B illustrates the range $\{0, 1\}$ of pixel values. In FIG. 10B the minimum value is 0 and the maximum value is 1. FIG. 10B illustrates the adjustment of maxima pixels. In a first example, the centroid pixel has a starting value of 0.3. Generally a pixel having a maxima score will be increased. The increase can be expressed as a percentage. The percentage increase can be a function of the score. For example, suppose the 0.3 pixel value is chosen to be increased by a factor of 0.5 times the interval $\{0.3, 1\}$, the new value will be 0.65—as indicated. In another example, a pixel has a value of 0.9 and has a certain maxima score. If in this example, the value is also to be increased by a factor of 0.5 times the interval $\{0.9, 1\}$ it will be increased to 0.95 as shown. These examples assumed a 50% increase. Any other percentage or change curve can also be chosen as determined by various algorithms.

Figure 10C:
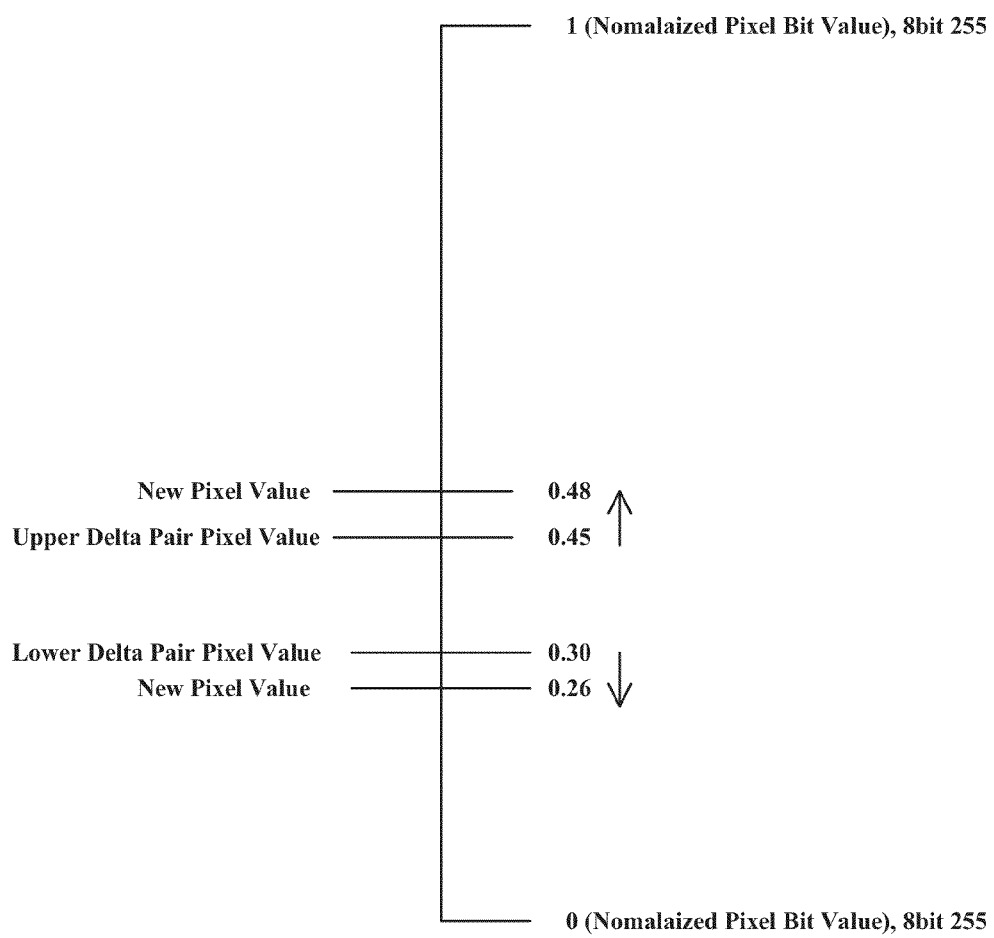

FIG. 10C illustrates how a pixel's value can be adjusted based on delta pairs. The vertical line in FIG. 10C illustrates the range $\{0, 1\}$ of values can be associated with a pixel. Here, a percentage adjustment doesn't represent the decrease in the difference between the value to be adjusted and 1 or 0; it represents the percentage that the delta in the delta pair is increased. Instead of adjusting just one pixel's value to reduce difference between it and 0 or 1, both pixels' values are adjusted to increase the difference between them. Using a delta pair threshold example of 0.15 and an adjustment value of 50% the lower pixel's value will be reduced to 0.26 and the upper pixel's value will be increased to 0.48, increasing the difference from 0.15 to 0.22—a 50% increase. Furthermore, a threshold could be used. For example, to qualify for this type of adjustment, delta pairs must have a difference of at least 0.15.

Figure 10D:
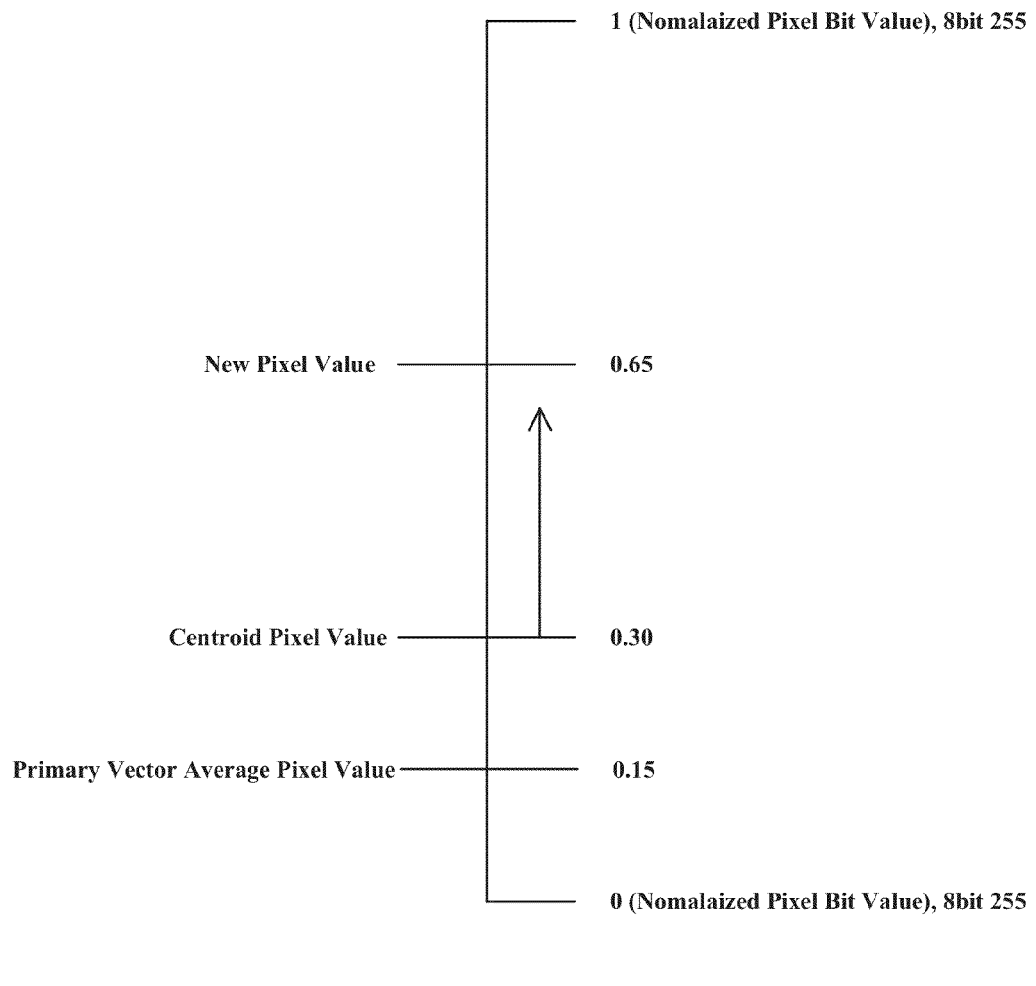

FIG. 10D illustrates how a centroid pixel value can be adjusted based on vectors. The vertical line in FIG. 10D illustrates the range $\{0, 1\}$ of values that can be associated with a pixel. When the primary vector associated with a centroid pixel is determined then the centroid pixel may be adjusted. In this example the pixel is increased 50%. From a value of 0.3 to 0.65 increase.

An adjustment function is a function used to adjust a value. An adjustment function can be chosen to take an input value "r" given in the range $\{0, 1\}$ and return a corresponding adjusted value "s" also lying in the range $\{0, 1\}$. In general the function can be specified using a general function "T" as: s=T(r, c) wherein the parameter "c" is related to one or more scores defined above. In accordance with embodiments of the present invention, many adjustment functions can be constructed that can include the score information "c." In one embodiment, a power law function can be chosen. For example, the starting value "r" can be transformed to the new value "s" according to the function:

$$s = r + (1-r)*c^p*f,$$

where "p" is a user chosen exponent and "f" is a normalizing factor that depends on "p" and the maximum value of "c." For example, "p" can be chosen to be any positive real number. The factor "f" can be chosen so that the transformed value "s" will lie within the interval $\{0,1\}$. This particular choice assumes that the input value "r" also lies within the interval $\{0,1\}$. For example, if the maximum value of the count "c" is "cmax" then the normalizing factor is chosen to be: $f=1/(cmax)^p$.

In another example embodiment, the adjustment function can be:

$$s = r - r*c^p*f.$$

Any function can be used. All such adjustment functions are considered to be within the range of disclosed embodiments. In embodiments, the parameter "c" can be chosen to be one of the scores (i.e., the minimum score, the maximum score, etc.).

FIG. 11 is a flow chart illustrating a method for generating a scored pixel adjustment of a digital image, according to an embodiment of the present invention. In this method a digital image 1102 having a collection of pixels each with a corresponding value is received 1104. The digital image may be received, for example, from local or remote data storage or from an image capture device. Further, at least one of the following operations 1106 for each of a plurality of pixels is performed: determining a minima score, determining a maxima score, determining delta pair scores, and determining vector scores. Next, the pixel values are adjusted 1108 based on the at least one of: the minima score, the maxima score, one or more delta pair scores, and one or more vector scores to generate corresponding adjusted pixel values. Next, an adjusted image is generated 1110 based on the adjusted pixel values. Lastly, the adjusted image 1114 is output 1112. In this method, the obtaining, the determining, generating, and outputting are performed by one or more machines. According to the present invention, the outputting includes any one of displaying, printing, storing, or transmitting the adjusted image (as discussed below with respect to FIG. 12).

FIG. 12 is a block diagram illustrating a computer-implemented system 1200 for generating a scored pixel adjustment of a digital image, according to an embodiment of the present invention.

The system 1200 includes a receiver module 1204, a score generation module 1206, a value adjustment module 1208, image adjustment module 1210, and an output module 1212. The output module may include, for example, a storage device 1214 and a display device 1216. In addition, the system may include a mixing module 1218.

Receiver module 1204 is configured to receive a digital image 1202 having a collection of pixels each with a corresponding value. The image can be received from data storage or from an image capture device. Score generation module 1206 is configured to determine at least one of the following quantities for each of a plurality of pixels: a minima score, a maxima score, one or more delta pair scores, and one or more vector scores. Pixel value adjustment module 1208 is configured to adjust the value of the plurality of pixels based on the one or more scores. Image adjustment module 1210 is configured to generate an adjusted image based on the adjusted pixel values, and the output module is configured to output the adjusted image. Multiple images may be generated based on the various scores. Such multiple images can be combined with each other and/or with the original input image using mixing module 1218. For example, four images can be generated based on the minima score, the maxima score, a delta pair score, and a vector score. A composite image can then be generated by mixing module 1218, wherein the pixel scores in each of the adjusted images, along with the pixel scores in the original image, is multiplied by a percentage. Thus, each pixel of the resultant image has its value given by a weighted average of the values of the corresponding images being combined.

FIG. 13 is an example machine 1300 in which embodiments of the present invention or portions thereof may be implemented as program instructions in the form of computer readable code. As an example, machine 1300 can be a processor based computing device. Such a processor based computing device is also commonly referred to as a computer.

Components or modules of the systems illustrated in FIG. 13 may be implemented in one or more computer systems 1300 or other processing systems using hardware, software, firmware, tangible computer readable media having instructions stored thereon, or a combination thereof.

System 1300 may include one or more processors 1302, a GPU 1314, one or more non-volatile storage media 1304, one or more memory devices 1306, a communications infrastructure 1308, a display device 1310, and a communication interface 1312. Processors 1302 may include any conventional or special-purpose processors including, but not limited to, digital signal processors (DSP), field-programmable gate arrays (FPGA), and application specific integrated circuits (ASIC).

GPU 1314 (graphics processing unit) is a specialized processor that executes instructions and programs selected for complex graphics and mathematical operations in parallel.

Non-volatile storage 1304 may include one or more of a hard disk drive, flash memory, and like devices that may store computer program instructions and data on computer readable media. One or more non-volatile storage devices 1304 may be a removable storage device.

Memory devices 1306 may include one or more volatile memory devices such as, but not limited to, random access memory. Communications infrastructure 1308 may include one or more device interconnect buses such as Ethernet, Peripheral Component Interconnect (PCI) and the like.

Typically, computer instructions are executed by one or more processors 1302 and can be stored in non-volatile storage media 1304 and memory devices 1306.

Display 1310 allows results of computer operations to be displayed to a user or an application developer. This could be a screen or a printer or any other display device.

Communication interface 1312 allows software and data to be transferred between computer system 1300 and external devices. Communication interface 1312 may include a modem, a network interface (such as an Ethernet card), a communication port, a USB slot and card, or the like. Software and data transferred via communication interface 1312 may be in the form of signals which may be electronic, electromagnetic, optical, or other signals capable of being received by communication interface 1312. These signals may be provided to communication interface 1312 via a communications path. The communication path carries signals and may be implemented using wire or cable, fiber optics, a phone line, a cellular phone link, an RF link, or other communications channels. This includes putting a printed image or CD in an envelope and mailing it.

Embodiments can also be directed to computer program products comprising program instructions in the form of software stored on any computer readable medium. Such software when executed by one or more data processing devices causes said devices to operate as described herein. Embodiments of the invention can employ any computer readable medium. Examples of computer readable mediums include, but are not limited to, primary storage devices (e.g., any type of random access memory), secondary storage devices (e.g., hard drives, floppy disks, USB's, CD ROMs, ZIP disks, tapes, magnetic storage devices, optical storage devices, MEMs, nanotechnological storage devices, etc.).

Typically, computer instructions are executed by one or more processors 1302 and can be stored in a non-volatile storage medium 1304 or memory device 1306. Computer instructions can be stored on system 1300 in a compiled file, an executable file, or a shared library. Computer instructions can also be included in a routine, a subroutine, or layers of a software stack that are manipulated by processors 1302.

FIG. 14 illustrates a system 1400 configured to generate a combined adjusted image 1414 and one or more secondary images 1420. System 1400 is a generalization of system 1200. Components or modules of the systems illustrated in FIG. 14 may be implemented in one or more computer systems 1300 or other processing systems using hardware, software, firmware, tangible computer readable media having instructions stored thereon, or a combination thereof.

System 1400 contains modules 1404 for generating scores, modules 1406 for adjusting values, and modules 1408 for generating adjusted images. Module 1404(1) is configured to receive an original image 1402 if a control switch 1402(1) is turned on. Module 1404(1) determines minima scores and the module output is the input to module 1406(1). Additionally, this output may be used to generate an auxiliary image (the auxiliary image output is not shown). Module 1406(1) adjusts the values based on minima scores generated by module 1404(1) and provides input to module 1408(1). Module 1408(1) generates a minima based image. The minima based image is a new image that is generated by selecting a plurality of pixels from the original image 1402 and adjusting the pixel values according to minima scores.

Module 1404(2) is configured to receive an original image 1402 if a control switch 1402(2) is turned on. Module 1404(2) determines maxima scores and the module output is input to module 1406(2). Additionally, this output may be used to generate an auxiliary image (the auxiliary image output is not shown). Module 1406(2) adjusts the values based on maxima scores generated by module 1404(2) and provides input to module 1408(2). Module 1408(2) generates a maxima based image. The maxima based image is a new image that is generated by selecting a plurality of pixels from the original image 1402 and adjusting the pixel values according to maxima scores.

Module 1404(3) is configured to receive an original image 1402 if a control switch 1402(3) is turned on. Module 1404(3) determines delta pair scores and the output of module 1404(3) is provided as input to module 1406(3). Additionally, this output may be used to generate an auxiliary image (the auxiliary image output is not shown). Module 1406(3) adjusts the values based on delta pair scores generated by module 1404(3) and provides input to module 1408(3). Module 1408(3) generates a delta pair based image. The delta pair based image is a new image that is generated by selecting a plurality of pixels from the original image 1402 and adjusting the pixel values according to delta pair scores.

Module 1404(4) is configured to receive an original image 1402 if a control switch 1402(4) is turned on. Module 1404(4) determines vector based scores and the output of module 1404(4) is provided as input to module 1406(4). Additionally, this output may be used to generate an auxiliary image (the auxiliary image output is not shown). Module 1406(4) adjusts the values based on vector based scores generated by module 1404(4) and provides input to module 1408(4). Module 1408(4) generates a vector based image. The vector based image is a new image that is generated by selecting a plurality of pixels from the original image 1402 and adjusting the pixel values according to vector based scores.

Next module 1412 is configured to generate a combined adjusted image which is a new image that is generated by combining two or more of a: minima based image, a maxima based image, a delta pair based image, and a vector based image. The value of each pixel of the combined adjusted image is assigned to be a fixed percentage of the corresponding values of the two or more or a: minima based image, a maxima based image, a delta pair based image, and a vector based image. In the combined adjusted image, the minima based image is assigned a fixed percentage 1410(1), the maxima based image is assigned a fixed percentage 1410(2), the delta pair based image is assigned a fixed percentage 1410(3), and the vector based image is assigned a fixed percentage 1410(4). In generating the combined adjusted image, the sum of the percentages 1410(1)+1410(2)+1410(3)+1410(4)=100%. In addition, a corresponding percentage 1410(5) of the original image may also be combined to generate the combined adjusted image. In this case, the relative percentages would satisfy 1410(1)+1410(2)+1410(3)+ 1410(4)+1410(5)=100%. The resulting combined adjusted image can then be provided as output 1414. The combined adjusted image can be output 1414 by displaying, storing, of transmitting the combined adjusted image.

In addition to the adjusted images 1408 and combinations thereof discussed above, the output image 1414 can take additional forms. For example, an image can be generated directly from the pixel scores. For example, instead of adjusting the pixel value of an image to generate a new image, the new image can have values given directly by the scores. In addition, the input or output image 1414 can be a histogram image which is a tabular and/or graphical representation of a digital image's individual pixel value count, as is known in the art.

In addition to outputting the combined adjusted image 1414, the combined adjusted image can be provided as input to one or more of modules 1416(1), 1416(2), and 1416(3). Module 1416(1) is configured to generate a difference image which is a new image that is generated by subtracting the values of the combined adjusted image from the original image. Module 1416(2) is configured to generate a comparison image which is a new image that is a side by side comparison of the adjusted image and the original image. Module 1416(3) is configured to generate a mixed image, which is a new image that is generated by combining the adjusted image with the original image. Each pixel's value in the mixed image is percentage weighted average of the corresponding values in the adjusted image and the original image.

Next, the output of modules 1416(1), 1416(2), and 1416(3) is input to module 1418, which is configured to generate one or more secondary images. A secondary image is any of the difference image, the comparison image, and the mixed image or any combination thereof.

The resulting secondary image is output 1420. The secondary image can be output by displaying, printing, storing or transmitting it.

Embodiments have been described above with the aid of functional building blocks illustrating the implementation of specified functions and relationships thereof. The boundaries of these functional building blocks have been defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily adjust and/or adapt for various applications such specific embodiments, without undue experimentation, without departing from the general concept of the present invention. Therefore, such adaptations and adjustments are intended to be within the meaning and range of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may not set forth all exemplary embodiments of the present invention as contemplated by the inventor(s), and thus, are not intended to limit the present invention and the claims in any way.

The breadth and scope of the present invention should not be limited by any of the above-described exemplary embodiments, but should be defined only in accordance with the following claims and their equivalents.

What is claimed is:

1. A machine-implemented method, comprising:
receiving a digital image having a collection of pixels each with a corresponding original value;
processing each pixel as a centroid pixel surrounded by neighboring pixels;
performing, for each of a plurality of centroid pixels, at least two of:
determining at least one of a minima score and a maxima score,
determining a delta pair and a delta pair difference, and
determining a primary vector set and a vector score;
generating an adjusted centroid pixel value for each of the plurality of centroid pixels to increase a difference between the original value of each given centroid pixel and the original value of at least one of its neighboring pixels based on the performed determinations for that given centroid pixel and an adjustment function;
generating a combined adjusted digital image based on all of the adjusted centroid pixel values; and
outputting the combined adjusted digital image,
wherein the receiving, the processing, the performing, the generating, and the outputting are performed by one or more machines.

2. A machine-implemented method, comprising:
receiving a digital image having a collection of pixels each with a corresponding original value;
processing each pixel as a centroid pixel surrounded by neighboring pixels;
scoring each of a plurality of centroid pixels with at least two of:
determining at least one of a minima score and maxima score,
determining a delta pair and a delta pair difference, and
determining a primary vector pixel set and a vector score;
combining, to generate a combined adjusted digital image, at least two selected from the group consisting of first adjusted values, second adjusted values, and third adjusted values, wherein
based on the scores from the minima and maxima determinations and a first adjustment function, the first adjusted values are generated for each of the plurality of said centroid pixels to increase a difference between each given centroid pixel's original value and the original value of at least two of its neighboring minima or maxima pixels,
based on the scores from the delta pair determinations and a second adjustment function, the second adjusted values are generated for each of the delta pair pixels to increase a difference between each given centroid pixel's original value and the original value of at least a neighboring delta pair pixel, and
based on the scores from the vector determinations and a third adjustment function, the third adjusted values are generated for each of the plurality of said centroid pixels to increase a difference between each given centroid pixel's original value and the original pixel values of its neighboring primary vector pixel set; and
outputting the combined adjusted digital image,
wherein the receiving, the processing, the scoring, the combining, and the outputting are performed by one or more machines.

3. The method according to claim 1 or 2, wherein the minima score for each centroid pixel is determined by examining the original values of neighboring pixel non-adjacent pairs and counting how many pairs for which the values of each pixel in a given non-adjacent pair are greater than the original value of the respective centroid pixel by at least a threshold value that is greater than or equal to zero.

4. The method according to claim 1 or 2, wherein the maxima score for each centroid pixel is determined by examining the original values of neighboring pixel non-adjacent pairs and counting how many pairs for which the values of each pixel in a given non-adjacent pair are less than the original value of the respective centroid pixel by at least a threshold value that is greater than or equal to zero.

5. The method according to claim 1 or 2, further comprising:
associating a plurality of pixel vector line segments (vectors) with each centroid pixel, wherein each vector runs in a direction through a number of neighboring pixels associated with that centroid pixel and terminates at that centroid pixel;
determining the vector score for a pixel vector associated with a particular centroid pixel by calculating at least one selected from a group consisting of:
an average of the values for those pixels in the vector, and
a weighted average of the values of the pixels intersected by the vector, wherein each pixel's weight is at least one selected from a group consisting of:
a function of a distance of the pixel from the centroid pixel,
a function of a length of the portion of the vector intersecting the pixel, and
a function of the area of the portion of the vector intersecting the pixel;
comparing the value of the centroid pixel to scores of its associated vectors; and
adjusting the value of the centroid pixel based on at least one selected from a group consisting of:
the score of a primary vector whose score is the most different from the centroid pixel,
the score of any of other vector, and
any combination of vector scores.

6. The method according to claim 1 or 2, wherein vectors associated with any given centroid pixel are selected based on at least one selected from a group consisting of the following:
are restricted to eight principle compass point directions;
are eight in number and are equally spaced in angle but not restricted to the compass point directions;
are of a number other than eight and are equally spaced in angle;
are of any number and any angle spacing;
are all a same length in pixels;
are all a same length geometrically;
are of two or more different lengths in pixels;
are of two or more different lengths defined geometrically;
are of fixed width or of no width; and
are of varying width where the width is a function of the distance from the centroid pixel.

7. The method according to claim 1 or 2, wherein at least one of the determining minima, maxima, delta pairs, and vector scores comprises at least one selected from a group consisting of "jumping the gap" of neighboring pixels and down sampling of pixels.

8. The method according to claim 1 or 2, wherein the digital image comprises a grayscale image, a color image, a 3-dimensional image, a movie, or a 3-dimensional movie.

9. The method according to claim 1 or 2, wherein the centroid pixel values are adjusted by a percentage of a remaining range of pixel values.

10. The method according to claim 1 or 2, further comprising outputting at least one selected from a group consisting of a secondary image, a mixed secondary image, and an auxiliary score image.

11. A machine-implemented image processing system, comprising:
a receiver module configured to receive a digital image having a collection of pixels each with a corresponding original value;
a score generation module configured to processes each pixel as a centroid pixel surrounded by neighboring pixels and to perform, for each of a plurality of centroid pixels, at least two of:
determining at least one of a minima score and a maxima score,
determining a delta pair and a delta pair difference, and
determining a primary vector set and a vector score;
a generating module configured to generate an adjusted centroid pixel value for each of the plurality of centroid pixels to increase a difference between the original value of each given centroid pixel and the original value of at least one of its neighboring pixels based on the performed determinations for that given centroid pixel and an adjustment function;
an image generation module configured to generate a combined adjusted digital image based on all of the adjusted centroid pixels; and
an output module configured to output the combined adjusted digital image.

12. A machine-implemented image processing system, comprising:
a receiver module configured to receive a digital image having a collection of pixels each with a corresponding original value;
a score generation module configured to processes each pixel as a centroid pixel surrounded by neighboring pixels and to perform, for each of a plurality of centroid pixels, at least two of:
determining at least one of a minima score and maxima score,
determining a delta pair and a delta pair difference, and
determining a primary vector pixel set and a vector score;
a module configured to generate a combined adjusted digital image by combining at least two selected from the group consisting of first adjusted values, second adjusted values, and third adjusted values, wherein
based on the scores from the minima and maxima determinations and a first adjustment function, the first adjusted values are generated for each of the plurality of said centroid pixels to increase a difference between each given centroid pixel's original value and the original value of at least two of its neighboring minima or maxima pixels,
based on the scores from the delta pair determinations and a second adjustment function, the second adjusted values are generated for each of the delta pair pixels to increase a difference between each given centroid pixel's original value and the original value of at least a neighboring delta pair pixel, and
based on the scores from the vector determinations and a third adjustment function, the third adjusted values are generated for each of the plurality of said centroid pixels to increase a difference between each given centroid pixel's original value and the original pixel values of its neighboring primary vector pixel set; and
an output module configured to output the combined adjusted digital image.

13. The system according to claim 11 or 12, wherein the score generation module is further configured to determine the minima score for each centroid pixel by examining the original values of neighboring pixel non-adjacent pairs and counting how many pairs for which the values of each pixel in a given non-adjacent pair are greater than the original value of the respective centroid pixel by at least a threshold value that is greater than or equal to zero.

14. The system according to claim 11 or 12, wherein the score generation module is further configured to determine the maxima score for each centroid pixel by examining the original values of neighboring pixel non-adjacent pairs and counting how many pairs for which the values of each pixel in a given non-adjacent pair are less than the original value of the respective centroid pixel by at least a threshold value that is greater than or equal to zero.

15. The system according to claim 11 or 12, wherein the score generation module is further configured to:
associate a plurality of pixel vector line segments (vectors) with each centroid pixel, wherein each vector runs in a direction through a number of neighboring pixels associated with that centroid pixel and terminates at that centroid pixel;
determine the vector score for a pixel vector associated with a particular centroid by calculating at least one selected from a group consisting of:
an average of the values for those pixels in the vector, and
a weighted average of the values of the pixels intersected by the vector, wherein each pixel's weight is at least one selected from a group consisting of:
a function of a distance of the pixel from the centroid pixel,
a function of a length of the portion of the vector intersecting the pixel, and
a function of the area of the portion of the vector intersecting the pixel;
compare the value of the centroid pixel to scores of its associated vectors; and
adjust the value of the centroid pixel based on at least one selected from a group consisting of:
the score of a primary vector whose score is the most different from the centroid pixel,
the score of any of other vector, and
any combination of vector scores.

16. The system according to claim 11 or 12, wherein the score generation module is further configured to select vectors associated with any given centroid pixel based on at least one selected from a group consisting of the following:
are restricted to eight principle compass point directions;
are eight in number and are equally spaced in angle but not restricted to the compass point directions;
are of a number other than eight and are equally spaced in angle;
are of any number and any angle spacing;
are all a same length in pixels;
are all a same length geometrically;
are of two or more different lengths in pixels;
are of two or more different lengths defined geometrically;
are of fixed width or of no width; and
are of varying width where the width is a function of the distance from the centroid pixel.

17. The system according to claim 11 or 12, wherein the score generation module is further configured to determine minima, maxima, delta pairs, and vector scores, by performing at least one selected from a group consisting of "jumping the gap" of neighboring pixels and down sampling of pixels.

18. The system according to claim 11 or 12, wherein the digital image is at least one selected from a group consisting of a grayscale image, a color image, a 3-dimensional image, a movie, and a 3-dimensional movie.

19. The system according to claim 11 or 12, wherein the adjustment module is configured to adjust centroid pixel values by a percentage of a remaining range of pixel values.

20. The system according to claim 11 or 12, wherein the system is further configured to output at least one selected from a group consisting of a secondary image, a mixed secondary image, and an auxiliary score image.

21. A non-transitory computer readable storage medium having program instructions stored thereon that, when executed by a processor, cause the processor to:
   receive a digital image having a collection of pixels each with a corresponding original value;
   process each pixel as a centroid pixel surrounded by neighboring pixels;
   perform, for each of a plurality of centroid pixels, at least two of:
      determining at least one of a minima score and a maxima score,
      determining a delta pair and a delta pair difference, and
      determining a primary vector set and a vector score;
   generate an adjusted value for each of the plurality of centroid pixels to increase a difference between the original value of each given centroid pixel and the original value of at least one of its neighboring pixels based on the performed determinations for that given centroid pixel and an adjustment function;
   generate a combined adjusted digital image based on all of the adjusted centroid pixel values; and
   output the combined adjusted digital image.

22. A non-transitory computer readable storage medium having program instructions stored thereon that, when executed by a processor, cause the processor to:
   receive a digital image having a collection of pixels each with a corresponding original value;
   process each pixel as a centroid pixel surrounded by neighboring pixels;
   score each of a plurality of centroid pixels with at least two of:
      determine at least one of a minima score and maxima score,
      determining a delta pair and a delta pair difference, and
      determine a primary vector pixel set and a vector score;
   combine, to generate a combined adjusted digital image, at least two selected from the group consisting of first adjusted values, second adjusted values, and third adjusted values, wherein
      based on the scores from the minima and maxima determinations and a first adjustment function, the first adjusted values are generated for each of the plurality of said centroid pixels to increase a difference between each given centroid pixel's original value and the original value of at least two of its neighboring minima or maxima pixels,
      based on the scores from the delta pair determinations and a second adjustment function, the second adjusted values are generated for each of the delta pair pixels to increase a difference between each given centroid pixel's original value and the original value of at least a neighboring delta pair pixel, and
      based on the scores from the vector determinations and a third adjustment function, the third adjusted values are generated for each of the plurality of said centroid pixels to increase a difference between each given centroid pixel's original value and the original pixel values of its neighboring primary vector pixel set; and
   output the combined adjusted digital image.

23. The computer readable storage medium according to claim 21 or 22, wherein the program instructions further comprise computer readable code that causes the processor to:
   determine the minima score for each centroid pixel by examining the original values of neighboring pixel non-adjacent pairs and counting how many pairs for which the values of each pixel in a given non-adjacent pair are greater than the original value of the respective centroid pixel by at least a threshold value that is greater than or equal to zero.

24. The computer readable storage medium according to claim 21 or 22, wherein the program instructions further comprise computer readable code that causes the processor to:
   determine the maxima score for each centroid pixel by examining the original values of neighboring pixel non-adjacent pairs and counting how many pairs for which the values of each pixel in a given non-adjacent pair are less than the original value of the respective centroid pixel by at least a threshold value that is greater than or equal to zero.

25. The computer readable storage medium according to claim 21 or 22, wherein the program instructions further comprise computer readable code that causes the processor to:
   associate a plurality of pixel vector line segments (vectors) with each centroid pixel, wherein each vector runs in a direction through a number of neighboring pixels associated with that centroid pixel and terminates at that centroid pixel;
   determine the vector score for a pixel vector associated with a particular centroid by calculating at least one selected from a group consisting of:
      an average of the values for those pixels in the vector, and
      a weighted average of the values of the pixels intersected by the vector, wherein each pixel's weight is at least one selected from a group consisting of:
         a function of a distance of the pixel from the centroid pixel,
         a function of a length of the portion of the vector intersecting the pixel, and
         a function of the area of the portion of the vector intersecting the pixel;
   compare the value of the centroid pixel to scores of its associated vectors; and
   adjust the value of the centroid pixel based on at least one selected from a group consisting of:
      the score of a primary vector whose score is the most different from the centroid pixel,
      the score of any of other vector, and
      any combination of vector scores.

26. The computer readable storage medium according to claim 21 or 22, wherein the program instructions further comprise computer readable code that causes the processor to select vectors associated with any given centroid pixel based on at least one selected from a group consisting of the following:
   are restricted to eight principle compass point directions;
   are eight in number and are equally spaced in angle but not restricted to the compass point directions;

are of a number other than eight and are equally spaced in angle;
are of any number and any angle spacing;
are all a same length in pixels;
are all a same length geometrically;
are of two or more different lengths in pixels;
are of two or more different lengths defined geometrically;
are of fixed width or of no width; and
are of varying width where the width is a function of the distance from the centroid pixel.

27. The computer readable storage medium according to claim 21 or 22, wherein the program instructions that comprise computer readable code that causes the processor to determine minima, maxima, delta pairs, and vector scores, further comprise computer readable code that causes the processor to perform at least one selected from a group consisting of "jumping the gap" of neighboring pixels and down sampling of pixels.

28. The computer readable storage medium according to claim 21 or 22, wherein the digital image is at least one selected from a group consisting of a grayscale image, a color image, a 3-dimensional image, a movie, and a 3-dimensional movie.

29. The computer readable storage medium according to claim 21 or 22, wherein the program instructions further comprise computer readable code that causes the processor to adjust centroid pixel values by a percentage of a remaining range of pixel values.

30. The computer readable storage medium according to claim 21 or 22, wherein the program instructions further comprise computer readable code that causes the processor to output at least one selected from a group consisting of a secondary image, a mixed secondary image, and an auxiliary score image.

31. A machine-implemented method, comprising:
receiving a digital image having a collection of pixels each with a corresponding original value;
processing each pixel as a centroid pixel surrounded by neighboring pixels;
determining a primary vector pixel set and a vector score for each centroid pixel;
generating adjusted centroid pixel values to increase a difference between each given centroid pixel's original value and an average value of the primary vector pixel set based on the corresponding vector score for that given centroid pixel and an adjustment function;
generating an adjusted digital image based on all of the adjusted centroid pixel values; and
outputting the adjusted digital image,
wherein the receiving, the processing the generating, and the outputting are performed by one or more machines.

32. The method according to claim 31, further comprising:
associating a plurality of pixel vector line segments (vectors) with each centroid pixel, wherein each vector runs in a direction through a number of neighboring pixels associated with that centroid pixel and terminates at that centroid pixel;
determining the vector score for a pixel vector associated with a particular centroid pixel by calculating at least one selected from a group consisting of:
an average of the original values for those pixels in the vector, and
a weighted average of the original values of the pixels intersected by the vector, wherein each pixel's weight is at least one selected from a group consisting of:
a function of a distance of the pixel from the centroid pixel,
a function of a length of the portion of the vector intersecting the pixel, and
a function of the area of the portion of the vector intersecting the pixel;
comparing the original value of the centroid pixel to scores of its associated vectors; and
adjusting the original value of the centroid pixel based on at least one selected from a group consisting of:
the score of a primary vector whose score is the most different from the centroid pixel,
the score of any of other vector, and
any combination of vector scores.

33. The method according to claim 31, wherein, for determining the vector score, selecting vectors associated with any given centroid pixel based on at least one selected from a group consisting of the following:
are restricted to eight principle compass point directions;
are eight in number and are equally spaced in angle but not restricted to the compass point directions;
are of a number other than eight and are equally spaced in angle;
are of any number and any angle spacing;
are all a same length in pixels;
are all a same length geometrically;
are of two or more different lengths in pixels;
are of two or more different lengths defined geometrically;
are of fixed width or of no width; and
are of varying width where the width is a function of the distance from the centroid pixel.

34. A machine-implemented image processing system, comprising:
a receiver module configured to receive a digital image having a collection of pixels each with a corresponding original value;
a score generation module configured to processes each pixel as a centroid pixel surrounded by neighboring pixels and to determine a primary vector pixel set and a vector score for each centroid pixel;
a generation module configured to generate adjusted centroid pixel values to increase a difference between each given centroid pixel's original value and an average value of the primary vector pixel set based on the corresponding vector score for that given centroid pixel and an adjustment function;
an image generation module configured to generate an adjusted digital image based on all of the adjusted centroid pixels; and
an output module configured to output the adjusted digital image.

35. The system according to claim 34, wherein the score generation module is further configured to:
associate a plurality of pixel vector line segments (vectors) with each centroid pixel, wherein each vector runs in a direction through a number of neighboring pixels associated with that centroid pixel and terminates at that centroid pixel;
determine the vector score for a pixel vector associated with a particular centroid by calculating at least one selected from a group consisting of:
an average of the values for those pixels in the vector, and
a weighted average of the values of the pixels intersected by the vector, wherein each pixel's weight is at least one selected from a group consisting of:
a function of a distance of the pixel from the centroid pixel, a function of a length of the portion of the vector intersecting the pixel, and
a function of the area of the portion of the vector intersecting the pixel;
compare the value of the centroid pixel to scores of its associated vectors; and
adjust the value of the centroid pixel based on at least one selected from a group consisting of:
the score of a primary vector whose score is the most different from the centroid pixel,
the score of any of other vector, and
any combination of vector scores.

36. The system according to claim 34, wherein, for determining the vector score, the score generation module is further configured to select vectors associated with any given centroid pixel based on at least one selected from a group consisting of the following:
are restricted to eight principle compass point directions;
are eight in number and are equally spaced in angle but not restricted to the compass point directions;
are of a number other than eight and are equally spaced in angle;
are of any number and any angle spacing;
are all a same length in pixels;
are all a same length geometrically;
are of two or more different lengths in pixels;
are of two or more different lengths defined geometrically;
are of fixed width or of no width; and
are of varying width where the width is a function of the distance from the centroid pixel.

37. A non-transitory computer readable storage medium having program instructions stored thereon that, when executed by a processor, cause the processor to:
receive a digital image having a collection of pixels each with a corresponding original value;
process each pixel as a centroid pixel surrounded by neighboring pixels;
determine a primary vector pixel set and a vector score for each centroid pixel;
generate adjusted centroid pixel values to increase a difference between each given centroid pixel's original value and an average value of the primary vector pixel set based on the corresponding vector score for that given centroid pixel and an adjustment function;
generate an adjusted digital image based on all or the adjusted centroid pixel values; and
output the adjusted digital image.

38. The computer readable storage medium of claim 37, wherein the program instructions further comprise computer readable code that causes the processor to:
associate a plurality of pixel vector line segments (vectors) with each centroid pixel, wherein each vector runs in a direction through a number of neighboring pixels associated with that centroid pixel and terminates at that centroid pixel;
determine the vector score for a pixel vector associated with a particular centroid by calculating at least one selected from a group consisting of:
an average of the values for those pixels in the vector, and
a weighted average of the values of the pixels intersected by the vector, wherein each pixel's weight is at least one selected from a group consisting of:
a function of a distance of the pixel from the centroid pixel,
a function of a length of the portion of the vector intersecting the pixel, and
a function of the area of the portion of the vector intersecting the pixel;
compare the value of the centroid pixel to scores of its associated vectors; and
adjust the value of the centroid pixel based on at least one selected from a group consisting of:
the score of a primary vector whose score is the most different from the centroid pixel,
the score of any of other vector, and
any combination of vector scores.

39. The computer readable storage medium of claim 37, wherein, for determining the vector score, the program instructions further comprise computer readable code that causes the processor to select vectors associated with any given centroid pixel based on at least one selected from a group consisting of the following:
are restricted to eight principle compass point directions;
are eight in number and are equally spaced in angle but not restricted to the compass point directions;
are of a number other than eight and are equally spaced in angle;
are of any number and any angle spacing;
are all a same length in pixels;
are all a same length geometrically;
are of two or more different lengths in pixels;
are of two or more different lengths defined geometrically;
are of fixed width or of no width; and
are of varying width where the width is a function of the distance from the centroid pixel.

40. The method according to claim 1, wherein the delta pair difference and value adjustments are determined by:
comparing the value of the centroid pixel to the value of each pixel in a group of neighboring pixels;
finding the neighboring pixel that has the greatest value difference, wherein that greatest value neighboring pixel and the centroid pixel are a delta pair;
comparing the greatest difference to a threshold; and
adjusting the values of the delta pair pixels if the difference is greater than the threshold.

41. The method according to claim 40, wherein the group of neighboring pixels comprises the eight first neighbors, or the 16 second neighbors of the centroid pixel.

42. The method according to claim 1, wherein the delta pair difference and value adjustments are determined by:
comparing the value of the centroid pixel to the value of effective pixels, wherein the value of each effective pixel is an average of the values of two or more pixels within a group of pixels;
finding the effective pixel that has the greatest value difference, wherein that greatest value effective pixel and the centroid pixel are a delta pair;
comparing the greatest difference to a threshold; and
adjusting the values of the delta pair pixels if the difference is greater than the threshold.

43. The system according to claim 11, wherein the score generation module is further configured to determine the delta pair difference and value adjustments by:
comparing the value of the centroid pixel to the value of each pixel in a group of neighboring pixels;
finding the neighboring pixel that has the greatest value difference, wherein that greatest value neighboring pixel and the centroid pixel are a delta pair;
comparing the greatest difference to a threshold; and
adjusting the values of the delta pair pixels if the difference is greater than the threshold.

44. The system according to claim 43, wherein the group of neighboring pixels comprises the eight first neighbors, or the 16 second neighbors of the centroid pixel.

45. The system according to claim 11, wherein the score generation module is further configured to determine the delta pair difference and value adjustments by:
- comparing the value of the centroid pixel to the value of effective pixels, wherein the value of each effective pixel is an average of the values of two or more pixels within a group of pixels;
- finding the effective pixel that has the greatest value difference, wherein that greatest value effective pixel and the centroid pixel are a delta pair;
- comparing the greatest difference to a threshold; and
- adjusting the values of the delta pair pixels if the difference is greater than the threshold.

46. The computer readable storage medium according to claim 21, wherein the program instructions further comprise computer readable code that causes the processor to determine the delta pair difference and value adjustments by:
- comparing the value of the centroid pixel to the value of each pixel in a group of neighboring pixels;
- finding the neighboring pixel that has the greatest value difference, wherein that greatest value neighboring pixel and the centroid pixel are a delta pair;
- comparing the greatest difference to a threshold; and
- adjusting the values of the delta pair pixels if the difference is greater than the threshold.

47. The computer readable storage medium of claim 46, wherein the group of neighboring pixels comprises the eight first neighbors, or the 16 second neighbors of the centroid pixel.

48. The computer readable storage medium according to claim 21, wherein the program instructions further comprise computer readable code that causes the processor to determine the delta pair difference and value adjustments by:
- comparing the value of the centroid pixel to the value of effective pixels, wherein the value of each effective pixel is an average of the values of two or more pixels within a group of pixels;
- finding the effective pixel that has the greatest value difference, wherein that greatest value effective pixel and the centroid pixel are a delta pair;
- comparing the greatest difference to a threshold; and
- adjusting the values of the delta pair pixels if the difference is greater than the threshold.

* * * * *

UNITED STATES PATENT AND TRADEMARK OFFICE
CERTIFICATE OF CORRECTION

| | | |
|---|---|---|
| PATENT NO. | : 8,873,821 B2 | Page 1 of 1 |
| APPLICATION NO. | : 13/425240 | |
| DATED | : October 28, 2014 | |
| INVENTOR(S) | : Smith et al. | |

It is certified that error appears in the above-identified patent and that said Letters Patent is hereby corrected as shown below:

In the Claims

At column 31, line 27, Claim 21, please replace "adjusted value" with --adjusted centroid pixel value--.

Signed and Sealed this
Tenth Day of March, 2015

Michelle K. Lee
*Deputy Director of the United States Patent and Trademark Office*